US011952083B2

(12) United States Patent
Morris et al.

(10) Patent No.: US 11,952,083 B2
(45) **Date of Patent: *Apr. 9, 2024**

(54) COMPREHENSIVE SYSTEM FOR THE STORAGE AND TRANSPORTATION OF NATURAL GAS IN A LIGHT HYDROCARBON LIQUID MEDIUM

(71) Applicant: SEAONE HOLDINGS, LLC, Houston, TX (US)

(72) Inventors: Ian Morris, Cambell River (CA); Bruce Hall, Houston, TX (US); Tolulope O. Okikiolu, Houston, TX (US); CP Woodruff, Jr., Houston, TX (US)

(73) Assignee: SEAONE HOLDINGS, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,513

(22) Filed: Oct. 17, 2022

(65) Prior Publication Data

US 2023/0286618 A1 Sep. 14, 2023

Related U.S. Application Data

(63) Continuation of application No. 16/998,556, filed on Aug. 20, 2020, now Pat. No. 11,485,455, which is a (Continued)

(51) Int. Cl.

*F25J 1/02* (2006.01)
*B63B 25/16* (2006.01)

(Continued)

(52) U.S. Cl.

CPC .............. *B63B 27/24* (2013.01); *B63B 25/16* (2013.01); *F17C 11/007* (2013.01);

(Continued)

(58) Field of Classification Search

CPC .. F17C 3/08; F17C 7/02; F17C 11/007; F17C 2221/033; F17C 2270/0102; F25J 1/0022; B63B 25/16

See application file for complete search history.

(56) References Cited

U.S. PATENT DOCUMENTS

| | | | |
|---|---|---|---|
| 2,497,793 | A | 2/1950 | Ransome |
| 2,550,844 | A | 5/1951 | Meiller et al. |

(Continued)

FOREIGN PATENT DOCUMENTS

| | | |
|---|---|---|
| GB | 1415729 | 11/1975 |

OTHER PUBLICATIONS

EP, 09767770.2 Extended Search Report, dated Dec. 12, 2016.

(Continued)

*Primary Examiner* — Brian M King
(74) *Attorney, Agent, or Firm* — ONE LLP

(57) ABSTRACT

This invention provides a means of loading, processing and conditioning raw production gas, production of CGL, storage, transport, and delivery of pipeline quality natural gas or fractionated products to market. The CGL transport vessel utilizes a pipe based containment system to hold more densely packed constituents of natural gas held within a light hydrocarbon solvent than it is possible to attain for natural gas alone under such conditions. The containment system is supported by process systems for loading and transporting the natural gas as a liquid and unloading the CGL from the containment system and then offloading it in the gaseous state. The system can also be utilized for the selective storage and transport of NGLs to provide a total service package for the movement of natural gas and associated gas production. The mode of storage is suited for both marine and land transportation and configured in modular form to suit a particular application and/or scale of operation.

17 Claims, 17 Drawing Sheets

Related U.S. Application Data continuation of application No. 12/486,627, filed on Jun. 17, 2009, now Pat. No. 10,780,955.

(60) Provisional application No. 61/074,502, filed on Jun. 20, 2008.

(51) Int. Cl.

| | |
|---|---|
| ***B63B 27/24*** | (2006.01) |
| ***F17C 11/00*** | (2006.01) |
| *B63B 25/08* | (2006.01) |
| *B63B 35/44* | (2006.01) |

(52) U.S. Cl.

CPC . *B63B 2025/087* (2013.01); *B63B 2035/4473* (2013.01); *B63B 2035/448* (2013.01); *F17C 2221/033* (2013.01); *F17C 2227/0192* (2013.01); *F17C 2270/0102* (2013.01)

(56) References Cited

U.S. PATENT DOCUMENTS

| | | | |
|---|---|---|---|
| 3,232,725 | A | 2/1966 | Secord et al. |
| 3,256,709 | A | 6/1966 | Stepleton |
| 3,262,411 | A | 7/1966 | Kaltenecker |
| 3,298,805 | A | 1/1967 | Secord et al. |
| 3,407,613 | A | 10/1968 | Muller et al. |
| 3,548,024 | A | 12/1970 | Kniel |
| 4,010,622 | A | 3/1977 | Etter |
| 4,024,720 | A | 5/1977 | Dimentsberg |
| 4,139,019 | A | 2/1979 | Bresie et al. |
| 4,203,742 | A | 5/1980 | Agnihotri |
| 4,479,350 | A | 10/1984 | Newton et al. |
| 4,622,053 | A | 11/1986 | Tomlinson et al. |
| 5,201,918 | A | 4/1993 | Vobach |
| 5,315,054 | A | 5/1994 | Teel |
| 6,023,942 | A | 2/2000 | Thomas et al. |
| 6,112,528 | A | 9/2000 | Rigby |
| 6,201,163 | B1 | 3/2001 | Morris et al. |
| 6,217,626 | B1 | 4/2001 | Morris et al. |
| 6,260,501 | B1 | 7/2001 | Agnew |
| 6,339,996 | B1 | 1/2002 | Campbell |
| 6,449,961 | B1 | 9/2002 | Korsgaard |
| 6,584,780 | B2 | 7/2003 | Hibino et al. |
| 6,584,781 | B2 | 7/2003 | Bishop et al. |
| 6,613,126 | B2 | 9/2003 | Tange et al. |
| 6,655,155 | B2 | 12/2003 | Bishop |
| 6,699,308 | B1 | 3/2004 | Nilsen et al. |
| 6,725,671 | B2 | 4/2004 | Bishop |
| 6,729,492 | B2 | 5/2004 | Gulati |
| 7,121,115 | B2 | 10/2006 | Lemaire et al. |
| 7,219,682 | B2 | 5/2007 | Agnew et al. |
| 7,607,310 | B2 | 10/2009 | Morris et al. |
| 2002/0178988 | A1 | 12/2002 | Bowen et al. |
| 2003/0061820 | A1 | 4/2003 | Bishop |
| 2003/0115889 | A1 | 6/2003 | Bishop et al. |
| 2006/0010911 | A1 | 1/2006 | Hubbard et al. |
| 2006/0011235 | A1 | 1/2006 | Bishop et al. |
| 2006/0042273 | A1 | 3/2006 | Morris et al. |
| 2006/0042692 | A1 | 3/2006 | Agnew et al. |
| 2006/0053806 | A1 | 3/2006 | Tassel |
| 2006/0075762 | A1 | 4/2006 | Wijngaarden et al. |
| 2007/0017575 | A1 | 1/2007 | Hall et al. |

OTHER PUBLICATIONS

WO, PCT/US2009/047858 ISR and Written Opinion, dated Aug. 18, 2009.

Howard, J. L., et al., "A Barge-Mounted Gas Liquefaction and Storage Plant", American Institute of Chemical Engineers, New York, Oct. 1979.

Richards, M., et al., "Design and Development of Ocean CNG Transport Systems", Natural Gas Technologies II, Phoenix, AZ, presented Feb. 11, 2004, 31 pages.

White, C., et al., "The Impact of Compressed Natural Gas Shipping upon Offshore Gas Development", Offshore Technology Conference, Houston, TX, 2000, 9 pages.

180

COMPREHENSIVE SYSTEM FOR THE STORAGE AND TRANSPORTATION OF NATURAL GAS IN A LIGHT HYDROCARBON LIQUID MEDIUM

CROSS REFERENCE TO RELATED APPLICATIONS

This application is a continuation of U.S. patent application Ser. No. 16/998,556, filed Aug. 20, 2020, which is a continuation of U.S. patent application Ser. No. 12/486,627, filed Jun. 17, 2009, now U.S. Pat. No. 10,780,955, which claims the benefit of U.S. Provisional Appl. No. 61/074,505, filed Jun. 20, 2008, all of which are fully incorporated herein by reference.

FIELD

The embodiments described herein relate to the collection of natural gas for transportation from remote reserves and, more particularly, to systems and methods that utilize modularized storage and process equipment configured for floating service vessels, platforms, and transport vessels to yield a total solution to the specific needs of a supply chain, enabling rapid economic development of remote reserves to be realized by a means not afforded by liquid natural gas (LNG) or compressed natural gas (CNG) systems, in particular reserves of a size deemed “stranded” or “remote” by the natural gas industry.

BACKGROUND INFORMATION

Natural gas is primarily moved by pipelines on land. Where it is impractical or prohibitively expensive to move the product by pipeline, LNG shipping systems have provided a solution above a certain threshold of reserve size. With the increasingly expensive implementation of LNG systems being answered by economies of scale of larger and larger facilities, the industry has moved away from a capability to service the smaller and most abundant reserves. Many of these reserves are remotely located and have not been economic to exploit using LNG systems. A backlash of land based environmental and safety issues in recent years has also led to counter innovations in floating LNG (FLNG) production facilities, and on board deepwater re-gasification and offloading processing trains and storage being fitted to some vessels—all at additional capital cost. Finding savings from simplification of the LNG transportation/processing cycle by turning to related pressurized LNG (PLNG) technology also has yet to materialize in the industry.

For LNG systems 40 as shown in FIG. 2, the raw natural gas stream from the gas field 12 enters a LNG production plant 42 where it is first necessary to pre-treat the natural gas stream to remove impurities such as $CO_2$, $H_2S$ and other sulfur compounds, Nitrogen and water. By removing these impurities, solids cannot be formed as the gas is refrigerated. Thereafter, the heavier ends, being $C_2$+ hydrocarbons, are removed under cryogenic conditions of −265 F and atmospheric pressure. The resulting LNG is made up of mostly (at least 90%) methane, while the $C_2$+ and NGLs require a separate handling and transportation system. LNG production plants 42 require high upfront capital in the order of billions of dollars for commercial scale operations, and are for the most part land based. These plants also require cryogenic temperature storage facilities 43 from where the LNG is pumped on board LNG carriers 44 arriving at adjacent docking points.

The LNG carriers 44 are specially constructed cryogenic gas carriers that transport 17 the liquid natural gas product at a density of 600 times that of natural gas at atmospheric conditions. A fleet shuttle service of LNG carriers 44 is run to LNG receiving and processing terminals 46 at the market end of the sea route, which typically require cryogenic temperature storage facilities 45. These terminals 46 receive the LNG, store and reheat it to atmospheric temperatures prior to compressing and cooling 47 it to the entry pressure of the transmission pipelines 26 and then injecting 48 the natural gas into the transmission pipelines 26 that deliver natural gas to market.

Recent work by the industry seeks to improve delivery capabilities by introducing floating LNG liquefaction plants and storage at the gas field and installing on board regasification equipment on LNG carriers for offloading gas offshore to nearby market locations that have opposed land based LNG receiving and processing terminals. To further reduce energy consumption by simplification of process needs, the use of pressurized LNG (PLNG) is once again under review by the industry for improvement of economics in an era of steeply rising costs for the LNG industry as a whole.

The advent of CNG transportation systems, to cater to the needs of a world market of increasing demand, has led to many proposals in the past decade. However, during this same time period there has only been one small system placed into full commercial service on a meaningful scale. CNG systems inherently battle design codes that regulate wall thicknesses of their containment systems with respect to operating pressures. The higher the pressure, the better the density of the stored gas with diminishing returns—however, the limitations of “mass of gas-to-mass of containment material” have forced the industry to look in other directions for economic improvements on the capital tied up in CNG containment and process equipment.

Work discussed in U.S. Pat. No. 6,655,155 (Bishop) is an example of the direction sought to improve cargo (gas) mass-to-containment mass ratio. In Bishop, increasing pressure is recognized as having limitations and the concepts of decreasing temperature and moving the gas into a dense phase state (as described in prior art by others) while avoiding the liquid phase of the gas is suggested by Bishop to be beneficial.

For CNG systems 50, as shown in FIG. 3, a less stringent processing system, again seeking better economics, is typically used to primarily remove water, $CO_2$ and $H_2S$ (when present) from the raw gas received from the gas field 12 to yield streams of a pipeline quality natural gas and marketable natural gas liquids (NGLs). On leaving the processing plant, the natural gas stream is compressed and cooled/chilled 53 before being loaded on board a CNG vessel 54. Various modes of loading CNG into containment vessels or tanks, including the use of displacement fluids, are typically employed. Bishop suggests pure glycol or methanol as suitable displacement fluids according to temperature needs.

During marine transportation 17 of the CNG, the CNG containment tanks aboard the CNG transport vessel 54 typically operate at temperatures as low as −30 F and at pressures from 1400 psig to 3600 psig. (Packaging of small amounts of natural gas for vehicle fuel resorts to pressures in the region of 10,000 psig to attain practical storage volumes). In general, designs proposed for commercial bulk transport are intended to carry the product at densities from 200 to 250 times the densities of the gas at atmospheric conditions. Under conditions of low temperature and high pressure a density approaching 300 times the atmospheric value is possible with accompanying higher energy requirements for compression and cooling, along with the requirement of even thicker walls for the containment vessels.

Unloading the CNG at receiving terminals requires a variety of solutions to ensure the product is completely evacuated or transferred from the containment vessels. These evacuation solutions range from the elegant use of displacement fluids 57, with or without pigging, to equilibrium blow-down 56, and to using energy consuming suction compressors 55 for final evacuation. Heat (along with NGL extraction 58 if required) has to be added to compensate for initial expansion cooling of the natural gas, and compression cooling 59 is then provided for injection 24 into the transmission pipelines 26 or storage vessels 25 if required.

Yet, the improved cargo density of CNG returns described in Bishop still do not meet those attainable with the combination of lower process energy for a liquid state storage method as outlined in U.S. Published Patent Application No. 2006/0042273 for a methodology to both create and store a liquid phase mix of natural gas and light hydrocarbon solvent, which is incorporated herein by reference. The liquid phase mix of natural gas and light hydrocarbon solvent is referred to hereafter as compressed gas liquid (CGL) product.

However, current solutions or services for natural gas production and transmission to market tend to be one size fits all and tend not to afford economic development of remote or stranded gas reserves. Accordingly, it is desirable to provide systems and methods that facilitate economic development of remote or stranded reserves to be realized by a means not afforded by liquid natural gas (LNG) or compressed natural gas (CNG) systems.

SUMMARY

Provided herein are exemplary embodiments directed to systems and methods that utilize modularized storage and process equipment scalably configurable for floating service vessels, platforms, and transport vessels to yield a total solution to the specific needs of a supply chain, enabling rapid economic development of remote reserves to be realized by a means not afforded by liquid natural gas (LNG) or compressed natural gas (CNG) systems, in particular reserves of a size deemed "stranded" or "remote" by the natural gas industry. The systems and methods described herein provide a full value chain to the reserve owner with one business model that covers the raw production gas processing, conditioning, transporting and delivering to market pipeline quality gas or fractionated products—unlike that of LNG and CNG. Moreover, the systems and methods described herein enable raw production gas to be loaded, processed, conditioned, transported (in liquid form) and delivered as pipeline quality natural gas or fractionated products at the market as well as providing complimentary natural gas service to sources presently linked to LNG (liquid natural gas) systems. It can also service on demand the needs of the industry to transport NGLs.

The disclosed embodiments provide a scalable means of receiving raw production or semi-conditioned gas, conditioning, CGL production and transporting this CGL product to a market where pipeline quality gas or fractionated products are delivered in a manner utilizing less energy than either CNG or LNG systems and giving a better ratio of cargo-mass to containment-mass for the natural gas component than that offered by CNG systems.

Other systems, methods, features and advantages of the invention will be or will become apparent to one with skill in the art upon examination of the following figures and detailed description.

BRIEF DESCRIPTION OF THE FIGURES

The details of the invention, including fabrication, structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

DETAILED DESCRIPTION OF THE PREFERRED EMBODIMENTS

The embodiments provided in the following descriptions are directed to a total delivery system built around CGL production and containment and, more particularly, to systems and methods that utilize modularized storage and process equipment scalably configurable for floating service vessels, platforms, and transport vessels to yield a total solution to the specific needs of a supply chain, enabling rapid economic development of remote reserves to be realized by a means not afforded by liquid natural gas (LNG) or compressed natural gas (CNG) systems, in particular reserves of a size deemed "stranded" or "remote" by the natural gas industry. The systems and methods described herein provide a full value chain to the reserve owner with one business model that covers the raw production gas processing, conditioning, transporting and delivering to market pipeline quality gas or fractionated products—unlike that of LNG and CNG.

Moreover, the special processes and equipment needed for CNG and LNG systems are not needed for a CGL based system. The operation specifications and construction layout of the containment system also advantageously enables the storage of pure ethane and NGL products in sectioned zones or holds of a vessel on occasions warranting mixed transport.

Figure 1A:
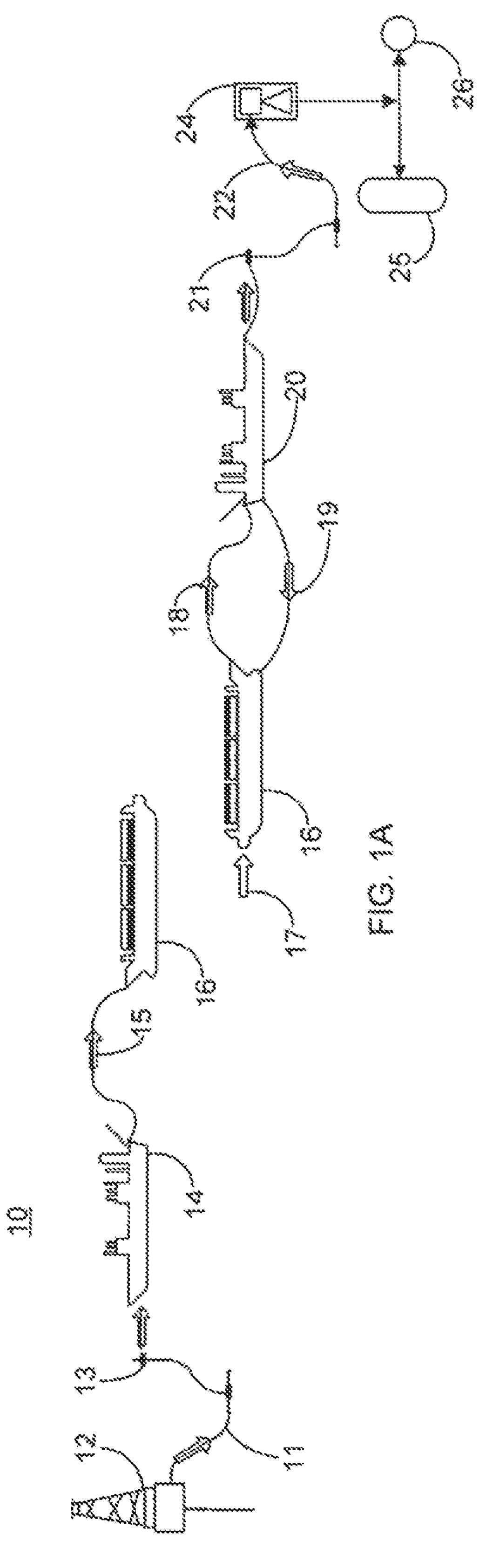
FIGS. 1A and 1B are schematic diagrams of CGL systems that enable raw production gas to be loaded, processed, conditioned, transported (in liquid form) and delivered as pipeline quality natural gas or fractionated products to market.

In accordance with a preferred embodiment, as depicted in FIG. 1A, the method of natural gas preparation, CGL product mixing, loading, storing and unloading is provided by process modules mounted on barges 14 and 20 operated at the gas field 12 and gas market locations. For transportation 17 of the CGL product between field 12 and market, a transportation vessel or CGL carrier 16 is preferably a purpose built vessel, a converted vessel or an articulated or standard barge selected according to market logistics of demand and distance, as well as environmental operational conditions.

To contain the CGL cargo, the containment system preferably comprises a carbon steel, pipeline-specification, tubular network nested in place within a chilled environment carried on the vessel. The pipe essentially forms a continuous series of parallel serpentine loops, sectioned by valves and manifolds.

The vessel layout is typically divided into one or more insulated and covered cargo holds, containing modular racked frames, each carrying bundles of nested storage pipe that are connected end-to-end to form a single continuous pipeline. Enclosing the containment system located in the cargo hold allows the circulation of a chilled nitrogen stream or blanket to maintain the cargo at its desired storage temperature throughout the voyage. This nitrogen also provides an inert buffer zone which can be monitored for CGL product leaks from the containment system. In the event of a leak, the manifold connections are arranged such that any leaking pipe string or bundle can be sectioned, isolated and vented to emergency flare and subsequently purged with nitrogen without blowing down the complete hold.

At the delivery point or market location, the CGL product is completely unloaded from the containment system using a displacement fluid, which unlike LNG and most CNG systems does not leave a "heel" or "boot" quantity of gas behind. The unloaded CGL product is then reduced in pressure outside of the containment system in low temperature process equipment where the start of the fractionation of the natural gas constituents begins. The process of separation of the light hydrocarbon liquid is accomplished using a standard fractionation train, with the rectifier and stripper sections split into two lower profile vessels in consideration of marine stability.

Compact modular membrane separators can also be used in the extraction of solvent from the CGL. This separation process frees the natural gas and enables it to be conditioned to market specifications while recovering the solvent fluid.

Trim control of minor light hydrocarbon components, such as ethane, propane and butane for BTU and Wobbe Index requirements, yields a market specification natural gas mixture for direct offloading to a buoy connected with shore storage and transmission facilities.

The hydrocarbon solvent is returned to vessel storage and any excess $C_2$, $C_3$, $C_4$ and $C_5$+ components following market tuning of the natural gas can be offloaded separately as fractionated products or value added feedstock supply credited to the account of the shipper.

For ethane and NGL transportation, or partial load transportation, sectioning of the containment piping also allows a portion of the cargo space to be utilized for dedicated NGL transport or to be isolated for partial loading of containment system or ballast loading. Critical temperatures and properties of ethane, propane and butane permit liquid phase loading, storage and unloading of these products utilizing allocated CGL containment components. Vessels, barges and buoys can be readily customized with interconnected common or specific modular process equipment to meet this purpose. The availability of de-propanizer and de-butanizer modules on board vessels, or offloading facilities permits delivery with a process option if market specifications demand upgraded product.

As depicted in FIG. 1A, in a CGL system 10 the natural gas from a field source 12 is preferably transmitted through a subsea pipeline 11 to a subsea collector 13 and then loaded on a barge 14 equipped for CGL product production and storage. The CGL product is then loaded 15 onto a CGL carrier 16 for marine transportation 17 to a market destination where it is unloaded 18 to a second barge 20 equipped for CGL product separation. Once separated, the CGL solvent is returned 19 to the CGL carrier 16 and the natural gas is offloaded to an offloading buoy 21 and then passes through a subsea pipeline 22 to shore where it is injected 24 into the gas transmission pipeline system 26 and/or on-shore storage 25 if required.

The barges 14 equipped for production and storage and the barges 20 equipped for separation can conveniently be relocated to different natural gas sources and gas market destinations as determined by contract, market and field conditions. The barge and vessel 14 and configuration, having a modular assembly, can accordingly be outfitted as required to suit route, field, market or contract conditions.

Figure 1B:
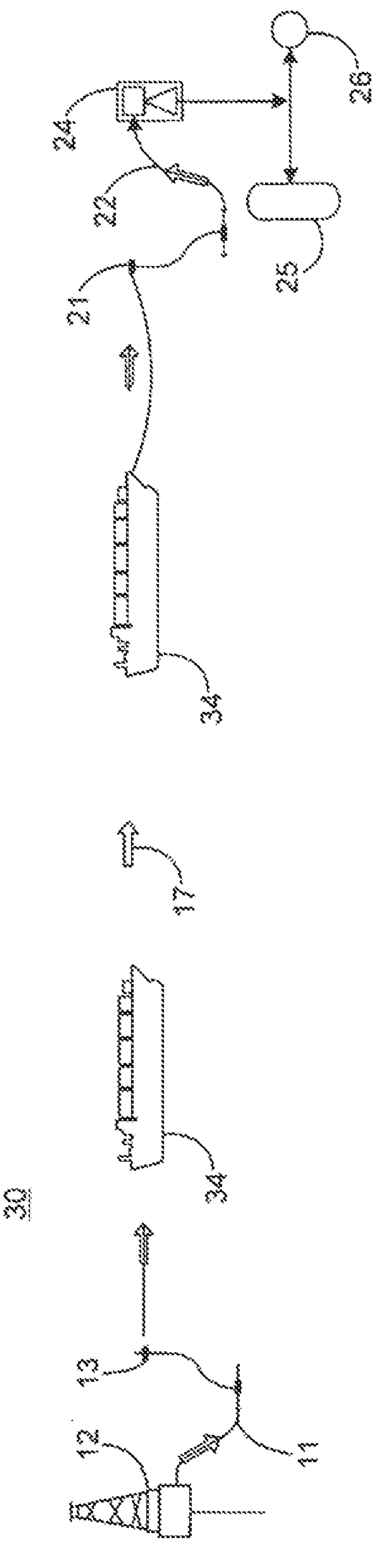
Figure 2:
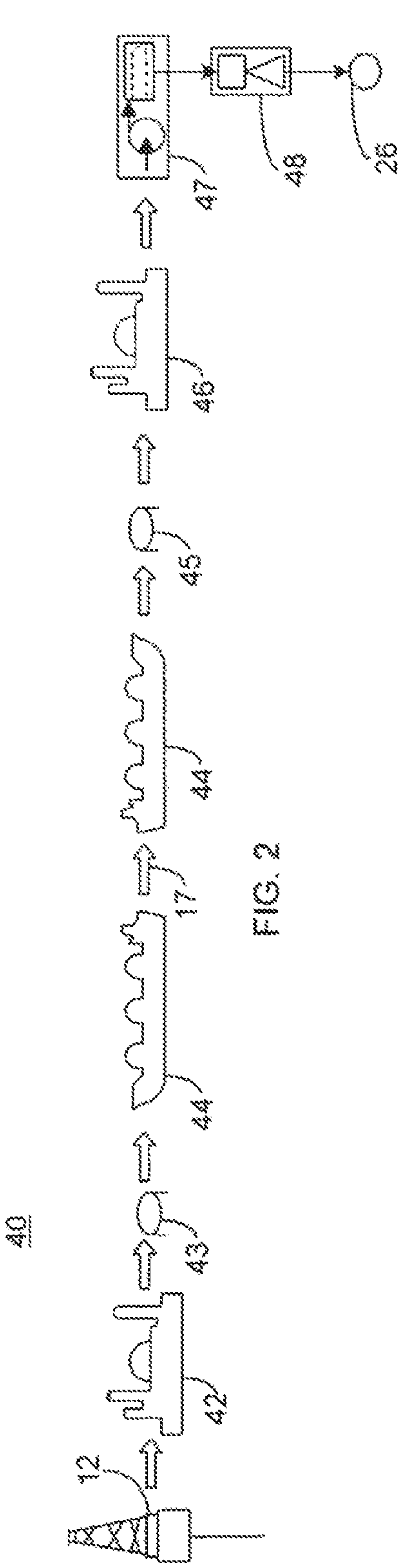
FIG. 2 is a schematic diagram of a LNG production, transport and processing system.
Figure 3:
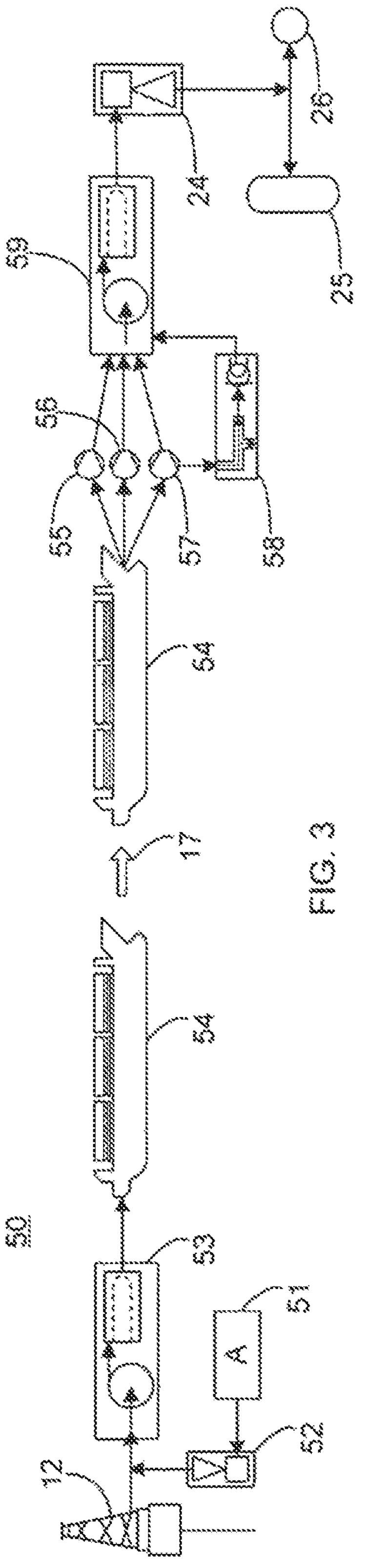
FIG. 3 is a schematic diagram of a CNG production, transport and unloading system.

In an alternative embodiment, as depicted in FIG. 1B, the CGL system 30 includes integral CGL carriers (CGLC) 34 equipped for raw gas conditioning and CGL product production, storage, transportation and separation, as describe in U.S. Pat. No. 7,517,391, entitled Method Of Bulk Transport And Storage Of Gas In A Liquid Medium, which is incorporated herein by reference.

Figure 4A:
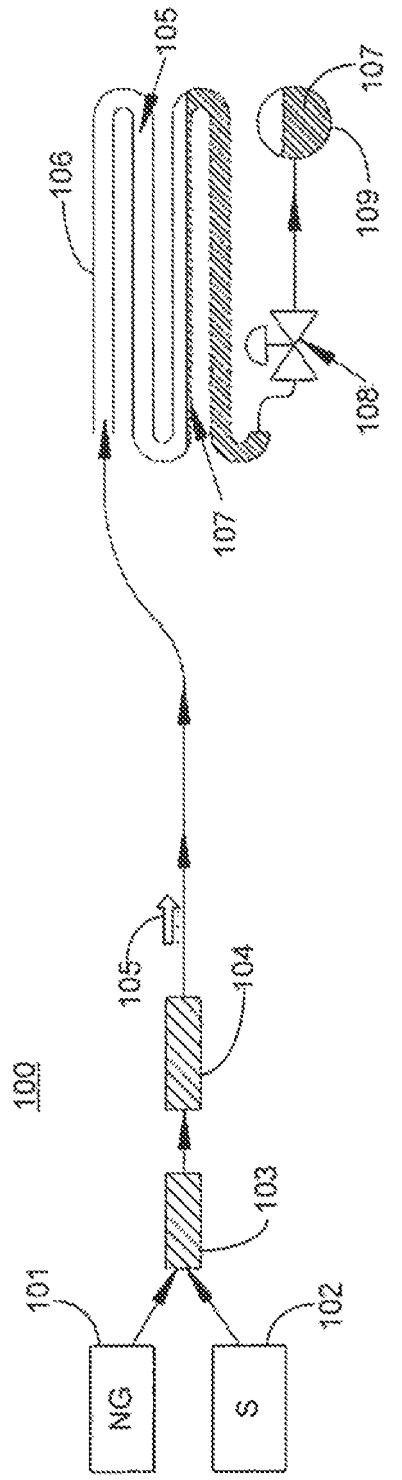
FIG. 4A is a schematic flow diagram of a process for producing CGL product and loading the CGL product into a pipeline containment system.

FIG. 4A illustrates the steps and system components in a process 100 comprising the production of CGL product and the storage of the CGL product in a containment system. For the CGL process 100, a stream of natural gas 101 is first prepared for containment using simplified standard industry process trains. The heavier hydrocarbons, along with acidic gases, excess nitrogen and water, are removed to meet pipeline specifications as per the dictates of the field gas constituents. The gas stream 101 is then prepared for storage by compressing, preferably in a range of about 1100 psig to 1400 psig, and then combining it with the light hydrocarbon solvent 102 in a static mixer 103 before chilling the mixture to preferably about −40° F. or below in a chiller 104 to produce a liquid phase medium referred to as the CGL product. U.S. Published Patent Application No. 2006/0042273, which is incorporated herein by reference, describes a methodology to both create and store a supply of CGL product under temperature conditions of about −40° to about −80° F. and pressure conditions of about 1200 psig to about 2150 psig. As discussed below with regard to Tables 1 and 2, CGL product is preferably stored at pressures within the range of about 900 psig to 2150 psig and temperatures with the range of about −40 F to −80 F.

The CGL product 105 is loaded into the containment piping 106 against the back pressure of a displacement fluid 107 to retain the CGL product 105 in its liquid state. The back pressure of the displacement fluid 107 is controlled by a pressure control valve 108 interposing the containment piping 106 and a displacement fluid storage tank 109. As CGL product 105 is loaded into the containment piping 106, it displaces the displacement fluid 107 causing it to flow toward the storage tank 109

Figure 4B:
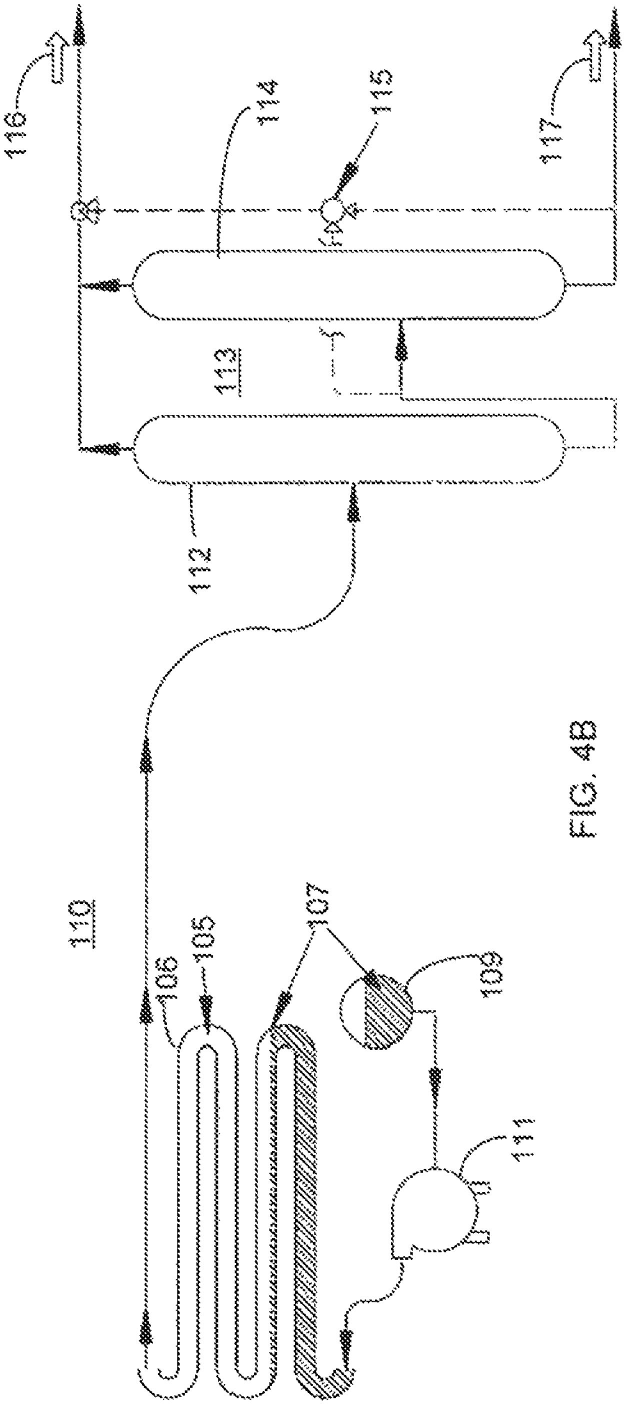
FIG. 4B is a schematic flow diagram of a process for unloading CGL product from the containment system and separating the natural gas and solvent of the CGL product.

FIG. 4B illustrates the steps and system components in a process 110 for unloading CGL product from the containment system and separating the natural gas and solvent of the CGL product. To unload the CGL product 105 from the containment piping 106, the flow of displacement fluid 107 is reversed by a pump 111 to flow into the containment piping 106 to push the lighter CGL product 105 toward a distillation train 113 having a separation tower 112 for separating the CGL product 105 into natural gas and solvent constituents. The natural gas exits the top of the tower 112 and is transmitted to transmission pipelines. The solvent exits the base of the separation tower 112 and flows into a solvent recovery tower 114 where the recovered solvent is returned 117 to the CGL carrier. A market specification natural gas can be obtained utilizing a natural gas BTU/Wobbe adjustment module 115.

As illustrated in Table 1 below, the natural gas cargo density and containment mass ratios achievable in a CGL system surpass those achievable in a CNG system. Table 1 provides comparable performance values for storage of natural gas applicable to the embodiments described herein and the CNG system typified by the work of Bishop for qualified gas mixes.

TABLE 1

| System & Design Code | CGL 1 CSA Z662-O3 | CGL 2 DNV Limit State | CNG 1 ASME B31.8 | CNG 2 ASME B31.8 |
|---|---|---|---|---|
| Storage Mix SG | 0.7 | 0.7 | 0.7 | 0.7 |
| Pressure (psig) | 1400 | 1400 | 1400 | 1400 |
| Temperature (F) | −40 | −40 | −30 | −20 |
| Natural Gas Density (lb/ft3) | 12.848 (net) | 12.848 (net) | 9.200 (net) 17.276 (gross) | 11.98 |
| Containment Pipe O.D. (inch) | 42 | 42 | 42 | 42 |
| Gas Mass /ft pipe length (lb) | 115.81 | 117.24 | 81.75 (net) 153.46 (gross) | 103.2 |
| Pipe Mass/ft pipe length (lb) | 297.40 | 243.41 | 361.58 | 491.11 |
| Cargo-to-Containment Mass Ratio | 0.39 lb/lb(net) | 0.48 lb/lb (net) | 0.22 lb/lb (net) | 0.21 lb/lb |

The specific gravity (SG) value for the mixes shown in Table 1 is not a restrictive value for CGL product mixes. It is given here as a realistic comparative level to relate natural gas storage densities for CGL based systems performance to that of the best large commercial scale natural gas storage densities attained by the patented CNG technology described in Bishop's work.

The CNG 1 values, along with those for CGL 1 and CGL 2 are also shown as "net" values for the 0.6 SG natural gas component contained within the 0.7 SG mixtures to compare operational performances with that of a pure CNG case illustrated as CNG 2. The 0.7 SG mixes shown in Table 1 contain an equivalent propane constituent of 14.5 mol percent. The likelihood of finding this 0.7 SG mixture in nature is infrequent for the CNG 1 transport system and would therefore require that the natural gas mix be spiked with a heavier light hydrocarbon to obtain the dense phase mixture used for CNG as proposed by Bishop. The CGL process, on the other hand and without restriction, deliberately produces a product used in this illustration of 0.7 SG range for transport containment.

The cargo mass-to-containment mass ratio values shown for CGL 1, CGL 2, and CNG 2 system are all values for market specification natural gas carried by each system. For purposes of comparison of the containment mass ratio of all technologies delivering market specification natural gas component gas, the "net" component of the CNG 1 stored mixture is derived. It is clear that the CNG systems, limited to the gaseous phase and associated pressure vessel design codes, are not able to attain the cargo mass-to-containment mass ratio (natural gas to steel) performance levels that the embodiments described herein achieve using CGL product (liquid phase) to deliver market specification natural gas.

Table 2 below illustrates containment conditions of CGL product where a variation in solvent ratio for select storage pressures and temperatures yields an improvement of storage densities. Through the use of more moderate pressures at lower temperatures than previously discussed, and applying the applicable design codes, reduced values of wall thickness from those shown in Table 1 can be obtained. Attainable values for the mass ratio of gas-to-steel for CGL product of over 3.5 times the values quoted earlier for CNG are thereby achievable.

TABLE 2

Mass Ratio at Select Containment Conditions of CGL (lb gas/lb steel)
(Design to CSA Z662-03)

| | TEMPERATURE | | | | |
|---|---|---|---|---|---|
| Pressure | −80 F. | −70 F. | −60 F. | −50 F. | −40 F. |
| 900 psig | 0.749<br>12 15.598 | 0.702<br>16 14.617 | | | |
| 1000 psig | 0.684<br>10 15.878 | 0.643<br>14 14.944 | 0.607<br>18 14.103 | | |
| 1100 psig | | 0.594<br>12 15.224 | 0.559<br>14 14.337 | | |
| 1200 psig | | 0.552<br>10 15.504 | 0.522<br>14 14.664 | 0.492<br>18 13.823 | |
| 1300 psig | | | 0.490<br>12 14.944 | 0.462<br>14 14.103 | 0.436<br>18 13.31 |
| 1400 psig | | | | 0.436<br>14 14.384 | 0.411<br>18 13.543 |

Key:

| Mgas/Msteel (Ib/lb) | |
|---|---|
| % Solvent (% mol) | Gas Density (lb/ft3) |

Figure 5A:
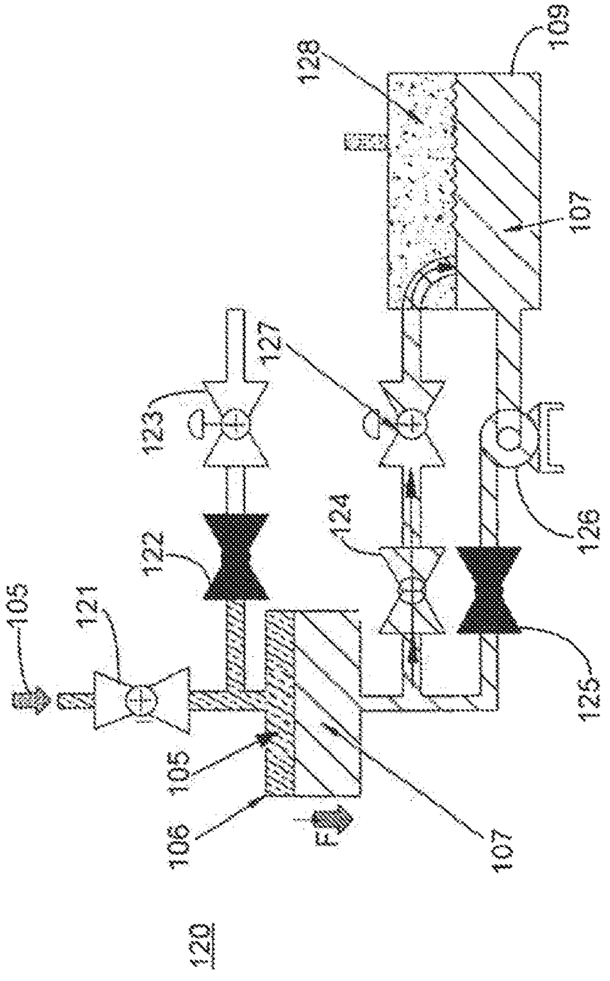
FIG. 5A is a schematic illustrating a displacement fluid principle for loading CGL product into a containment system.
Figure 5B:
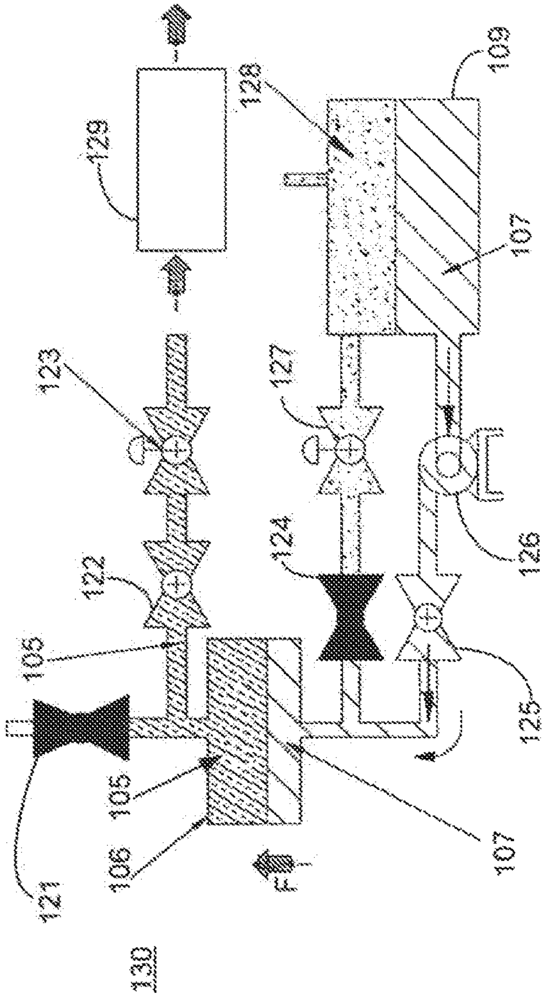
FIG. 5B is a schematic illustrating a displacement fluid principle for unloading CGL product out of a containment system.

Turning to FIGS. 5A and 5B the principle of using displacement fluid, which is common to the hydrocarbon industry, is illustrated under the storage conditions applicable to the specific horizontal tubular containment vessels or piping used in the disclosed embodiments. In a loading process 120, the CGL product 105 is loaded into the containment system 106 through an isolation valve 121, which is set to open in an inlet line, against the back pressure of the displacement fluid 107 to retain the CGL product 105 in its liquid state. The displacement fluid 107 preferably comprises a mixture of methanol and water. An isolation valve 122 is set to closed in a discharge line.

As the CGL product 105 flows F into the containment system 106 it displaces displacement fluid 107 causing it to flow through an isolation valve 124 positioned in a line returning to a displacement fluid tank 109 and set to open. A pressure control valve 127 in the return line maintains the displacement fluid 107 at sufficient back pressure to ensure the CGL product 105 is maintained in a liquid state in the containment system 106. During the loading process, an isolation valve 125 in a displacement fluid inlet line is set to closed.

Upon reaching its destination, the CGL vessel or carrier unloads the CGL product 105 from the containment system through an unloading process 132 that utilizes a pump 126 to reverse the flow F of the displacement fluid 107 from the storage tank 109 through an open isolation valve 125 to containment pipe bundles 106 to push the lighter CGL product 105 into a process header towards fractionating equipment of a CGL separation process train 129. The displaced CGL product 105 is removed from the containment system 106 against the back pressure of control valve 123 in the process header as isolation valve 122 is set to open. The CGL product 105 is held in the liquid state until this point, and only flashes to a gaseous/liquid process feed after passing through the pressure control valve 123. During this process, isolation valves 121 and 124 are set to close.

The displacement fluid 107 is reused in the filling/emptying of each successive pipe bundle 106 in the further interests of the limited storage space on board a marine vessel. The pipeline containment 106, in turn, is purged with a nitrogen blanket gas 128 to leave the "empty" pipe bundles 106 in an inert state while evacuating the pipe bundles 106 of displacement fluid 107.

U.S. Pat. No. 7,219,682, which illustrates one such displacement fluid method adaptable to the embodiments described herein, is incorporated herein by reference.

Figure 6C:
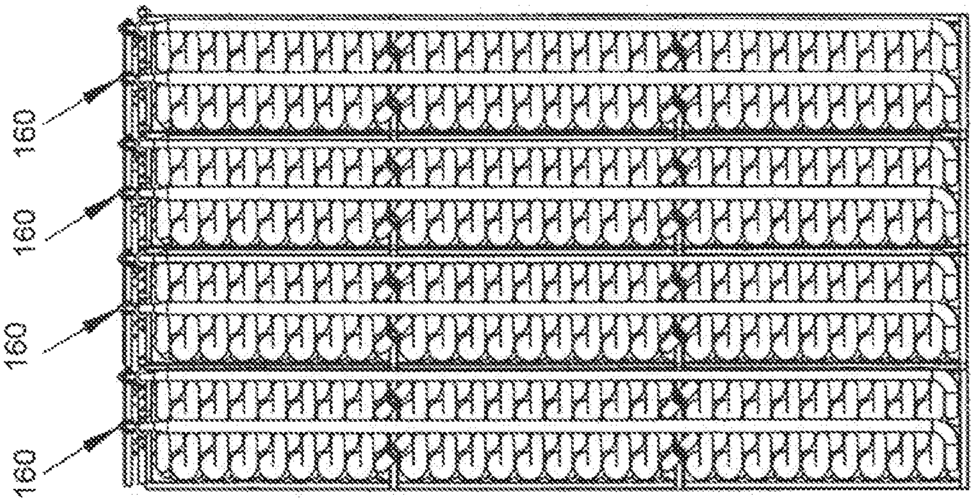
FIG. 6C is an end elevation view showing multiple pipe stacks coupled together side-by-side.
Figure 6B:
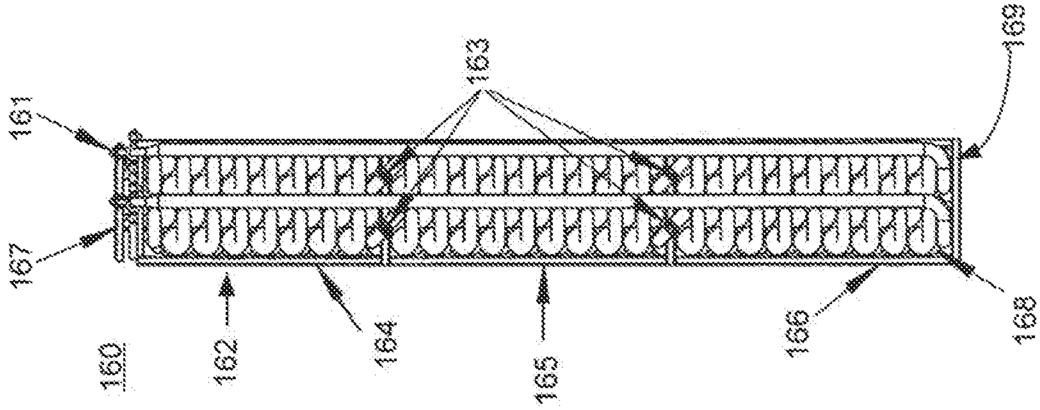
FIG. 6B is an end elevation view of another embodiment of a pipe stack showing interconnecting fittings.
Figure 6A:
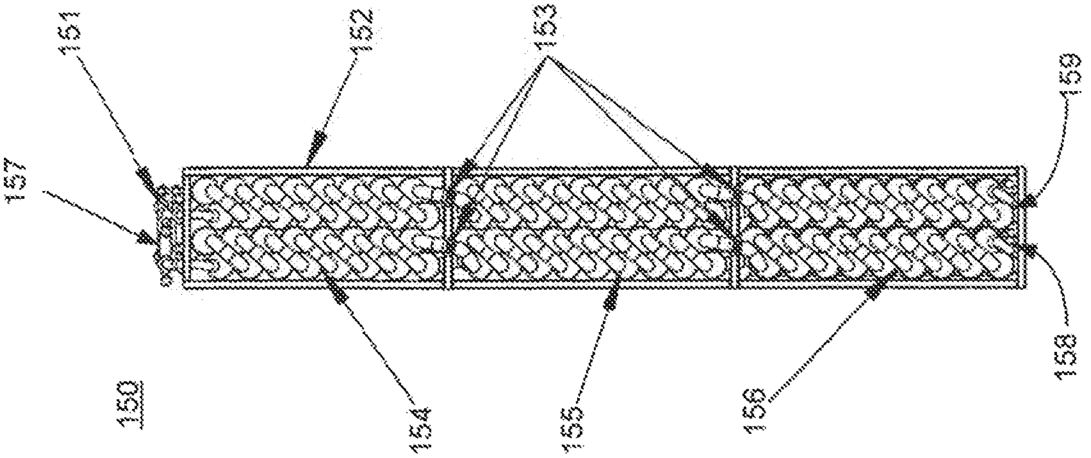
FIG. 6A is an end elevation view of an embodiment of a pipe stack showing interconnecting fittings.

Turning to FIG. 6A which shows a pipe stack 150 in accordance with one embodiment. As depicted, the pipe stack 150 preferably includes an upper stack 154, a middle stack 155 and a lower stack 156 of pipe bundles each surrounded by a bundle frame 152 and interconnected through interstack connections 153. In addition, FIG. 6 shows a manifold 157 and manifold interconnections 151 that enable the pipe bundles to be sectioned into a series of short lengths 158 and 159 for shuttling the limited volume of the displacement fluid into and out of the partition undergoing loading or unloading.

FIG. 6B another embodiment of a pipe stack 160. As depicted, the pipe stack 160 preferably includes an upper stack 164, a middle stack 165 and a lower stack 166 of pipe bundles each surrounded by a bundle frame 162 and interconnected through interstack connections 163, as well as, a manifold 167 and manifold interconnections 161 that enable the pipe bundles to be sectioned into a series of short lengths 168 and 169 for shuttling the limited volume of the displacement fluid into and out of the partition undergoing loading or unloading.

As shown in FIG. 6C, several pipe stacks 160 can be coupled side-by-side to one another. The pipe essentially forms a continuous series of parallel serpentine loops, sectioned by valves and manifolds. The vessel layout is typically divided into one or more insulated and covered cargo holds, containing modular racked frames, each carrying bundles of nested storage pipe that are connected end-to-end to form a single continuous pipeline.

Figure 7C:
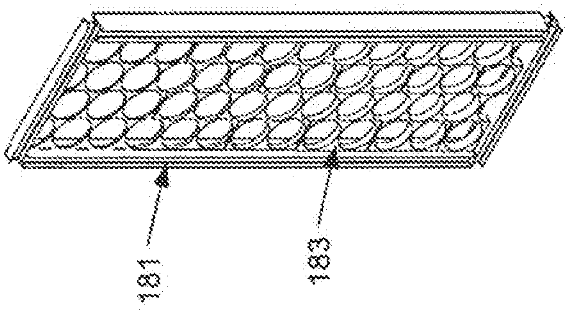
FIGS. 7A-7C are elevation, detail and perspective views of a pipe and stack support member.
Figure 7B:
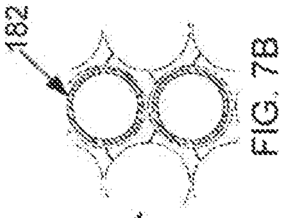
Figure 7A:
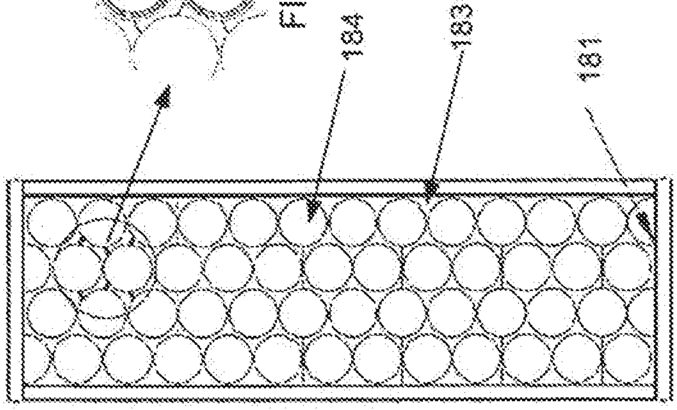
Figure 8A:
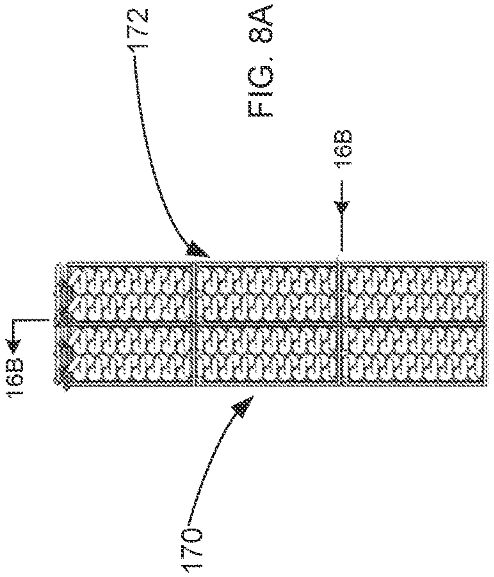
FIGS. 8A-8D are end elevation, split section (taken along line 8B-8B in FIG. 8A), plan and perspective views of bundle framing of containment piping.
Figure 8D:
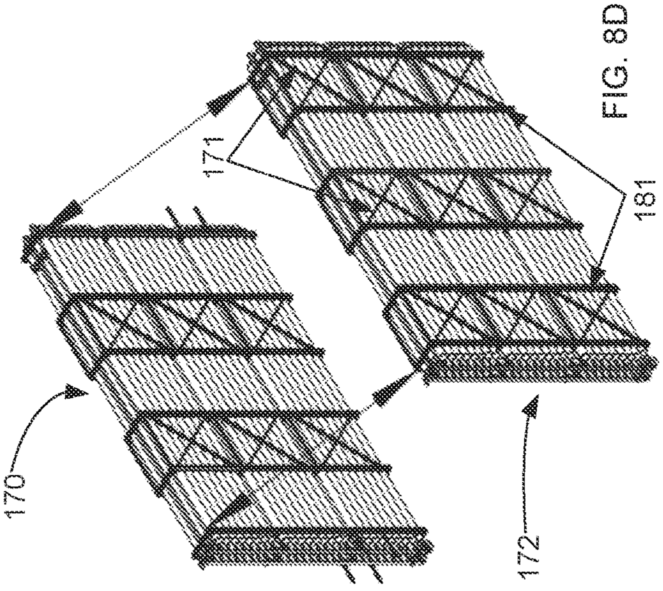
Figure 8B:
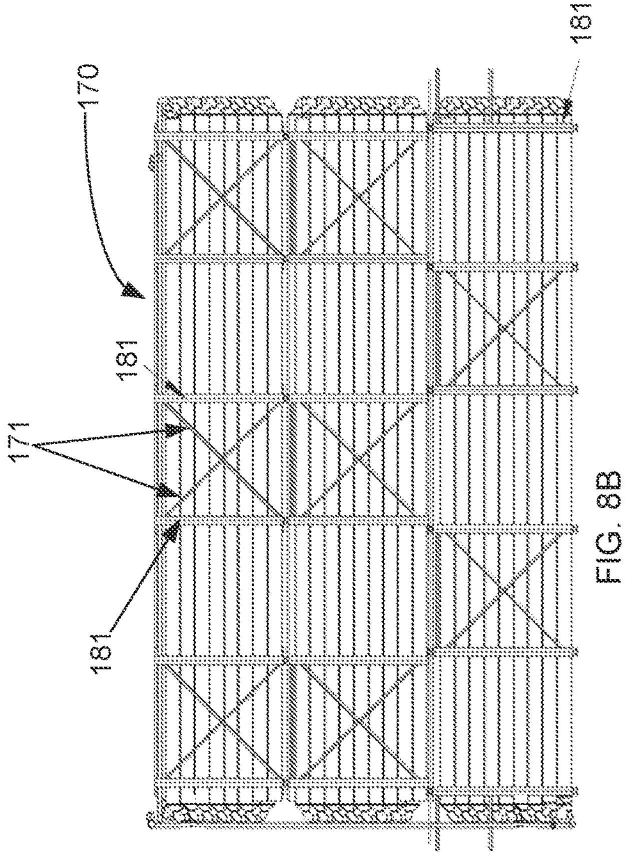
Figure 8C:
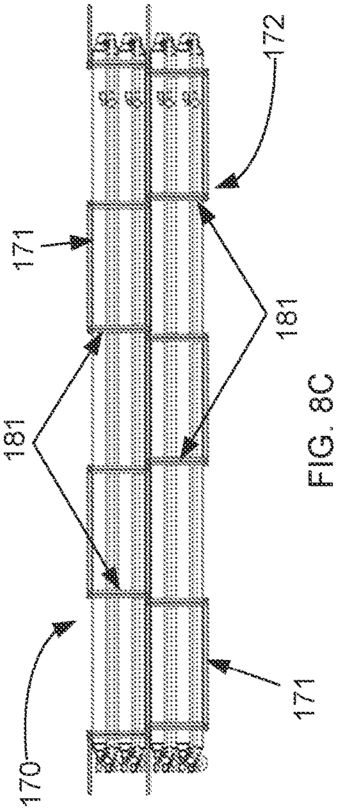

FIG. 7 shows a pipe support 180 comprising a frame 181 retaining one or more pipe support members 183. The pipe support member 183 is preferably formed from engineered material affording thermal movement to each pipe layer without imposing the vertical loads of self mass of the stacked pipe 182 (located in voids 184) to the pipe below.

As shown in FIGS. 8A-8D, an enveloping framework is provided for holding a pipe bundle. The framework includes cross members 171 coupled to the frame 181 of the pipe supports 180 and interconnecting pairs of the pipe support frames 181 together. The framing 181 and 171 and the engineered supports 183 carry the vertical loads of pipe and cargo to the base of the hold. The framing is constructed in two styles 170 and 172, which interlock when pipe bundle stacks are placed side by side as shown in FIGS. 6C, 8A, 8B and 8C. This enables positive location and the ability to remove individual bundles for inspection and repair purposes.

Figure 9:
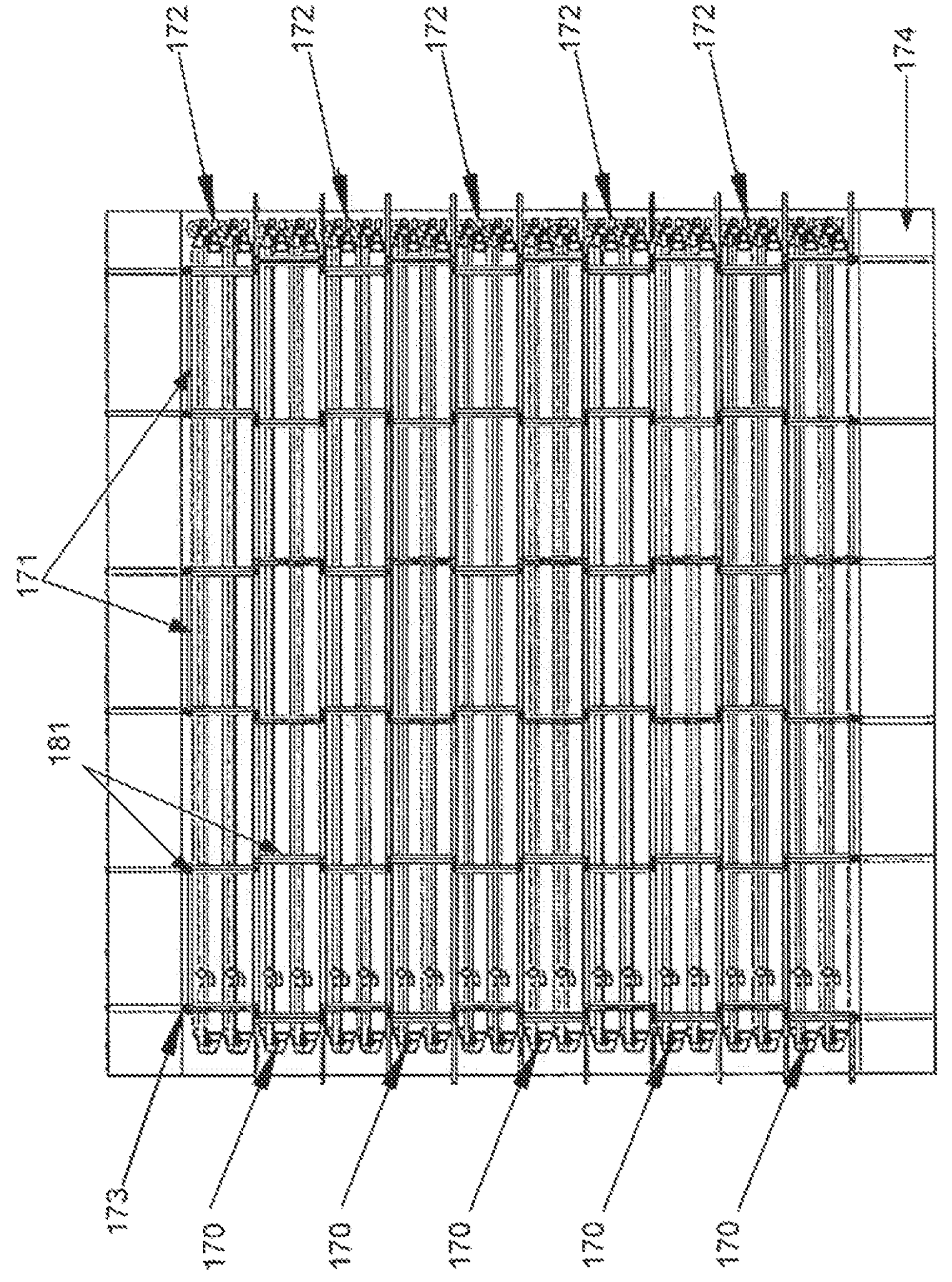
FIG. 9 is a top plan view of interlocked stacked pipe bundles across vessel hold.

FIG. 9 shows how the bundles 170 and 172, in turn, are stackable, transferring the mass of pipe and CGL cargo to the bundle framework 181 and 171 to the floor of the hold 174, and interlocking across, and along the walls of the hold 174 through elastic frame connections 173, to allow for positive location within the vessel, an important feature when the vessel is underway and subject to sea motion. The fully loaded condition of individual pipe strings additionally eliminates sloshing of the CGL cargo, which is problematic in other marine applications such as LNG and NGLs. Lateral and vertical forces are thus able to be transferred to the structure of the vessel through this framework.

Figure 10A:
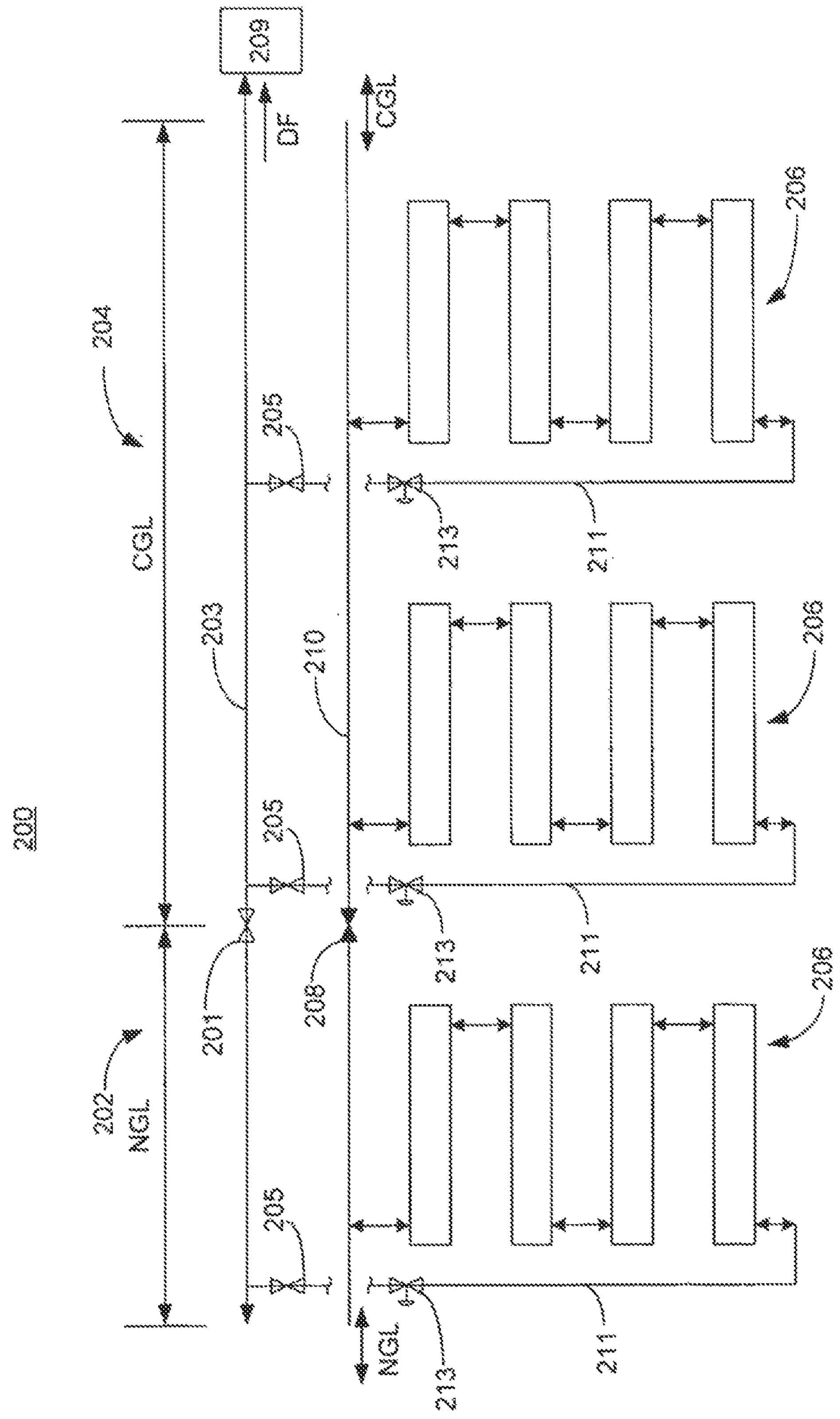
FIG. 10A is a schematic illustrating the use of a containment system for partial load of NGL.

FIG. 10A shows the isolation capability of the containment system 200 which can then be used to carry NGLs, loaded and unloaded by the same displacement system as used for loading and unloading the CGL product. As shown, the containment system 200 can be divided up into NGL containment 202 and CGL containment 204. A loading and unloading manifold 210 is shown to include one or more isolation valves 208 to isolate one or more pipe bundle stacks 206 from other pipe bundle stacks 206. CGL and NGL products flow through the loading and unloading manifold 210 as they are loaded into and unloaded out of the pipe bundles 206. A displacement fluid manifold 203 is shown coupled to a displacement fluid storage tank 209 and having one or more isolation valves 201. An inlet/outlet line 211 couples each of the pipe bundles 206 through an isolation valve 205 to the displacement fluid manifold 203. The CGL and NGL products are loaded and unloaded under a displacement fluid back pressure maintained by a pressure control valve 213 in the inlet/outlet line 211 and sufficient to maintain the CGL and NGL products in a liquid state. The loading and unloading manifold 210 is normally connected directly to an offloading hose. However, for a refinement of specifications of the landed product, the NGL can be selectively routed through de-propanizer and de-butanizer vessels in a CGL offloading train.

Figure 10B:
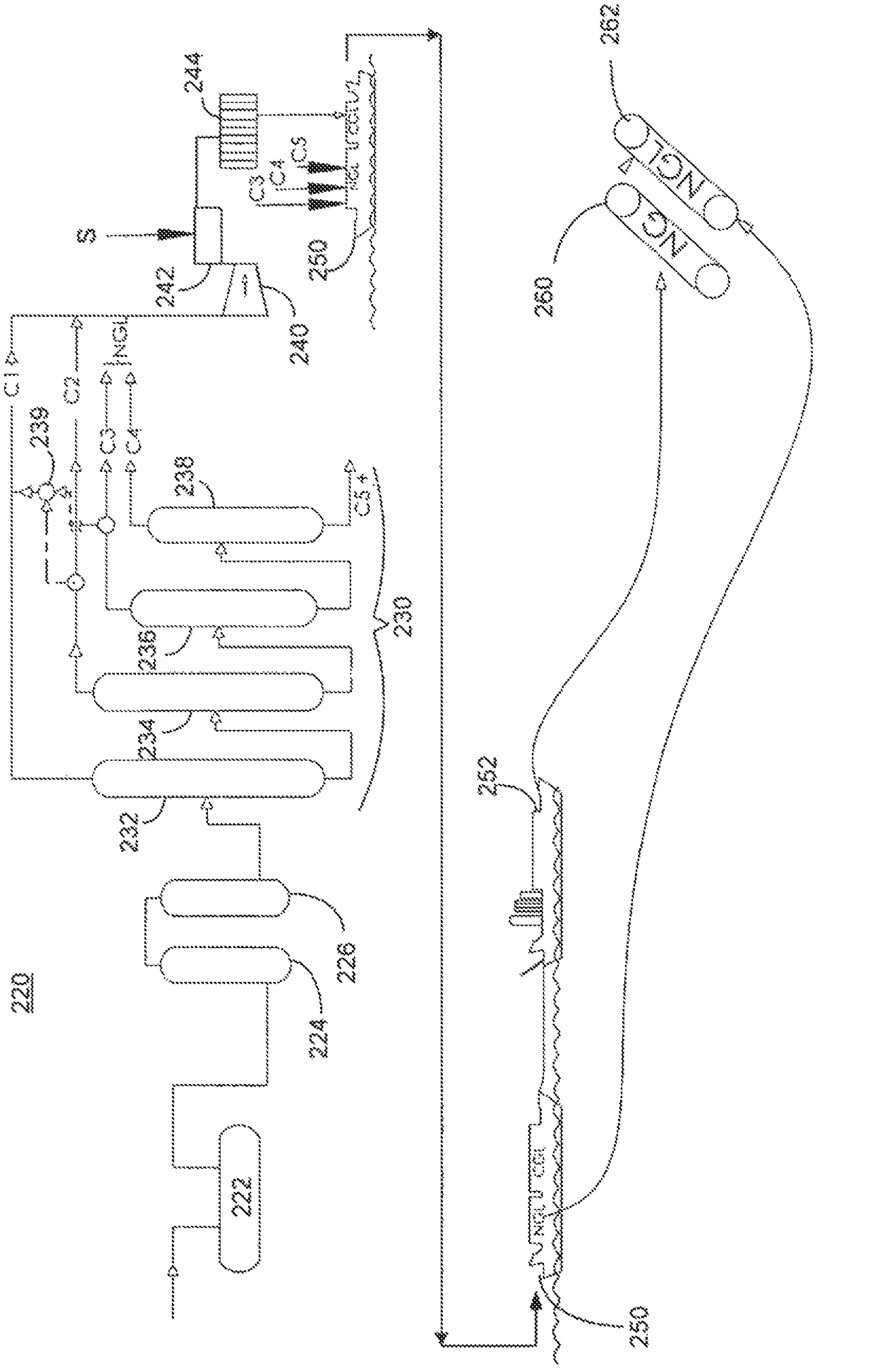
FIG. 10B is a schematic flow diagram illustrating raw gas being processed, conditioned, loaded, transported (in liquid form) and delivered as pipeline quality natural gas and fractionated products to market.

Turning to FIG. 10B, the flexibility of the CGL system in its ability to deliver fractionated products, control the BTU content of delivered gas, and adapt to the conditioning of various inlet gas specifications with the addition of modular processing units (e.g. amine unit—gas sweetening package) is illustrated. As depicted, in an example process 220, raw gas flows into the inlet gas scrubber 222 of a gas conditioning module for removal of water and other undesirable components prior to undergoing dehydration in a gas drying module 226. If necessary, the gas is sweetened using an optional amine module 224 to remove $H_2S$, $CO_2$, and other acid gases. The sweetened gas then passes through a standard gas process train module 230, where it is fractionated in successive fractionating modules 232, 234, 236 and 238. It is at this point that the light end ($C_1$ and $C_2$) BTU requirement is adjusted, if necessary, using a natural gas BTU/Wobbe adjustment module 239. The fractionated products—NGLs—($C_3$ to $C_5$+) are then stored in designated sections of the shuttle carrier's pipeline containment system as described with regard to FIG. 1A. The natural gas ($C_1$ and $C_2$) is compressed in compressor module 240, mixed with the solvent S in a metering and solvent mixing module 242, and chilled in a refrigeration module 244 to produce CGL product which is also stored in a pipeline containment system on the carrier 250. The carrier 250 is also loaded with fractionated products in its pipeline containment system that can be offloaded based on market requirements. Upon reaching the market location, the CGL product is unloaded from the carrier 250 to an offloading vessel 252, and, upon offloading of the natural gas product to a natural gas pipeline 260, solvent is returned to the CGL carrier 250 from the offloading vessel 252, which is fitted with a solvent recovery unit. Other NGLs can be delivered directly into the market's NGL pipeline system 262.

Figure 11B:
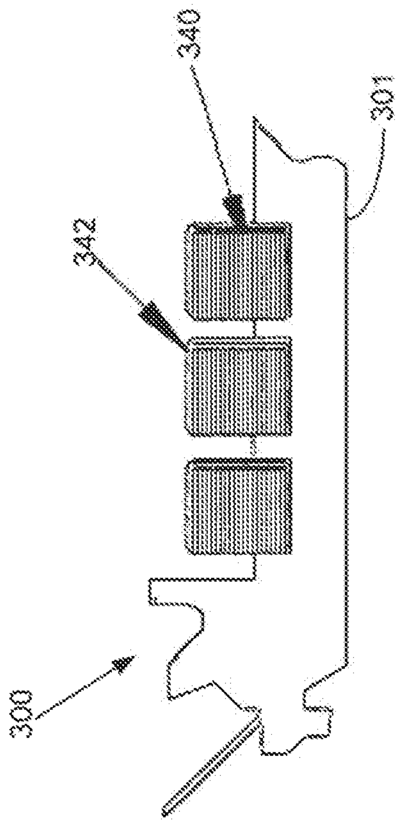
FIGS. 11A-11C are elevation, plan, and bow section views of a conversion vessel with integral carrier configuration.
Figure 11A:
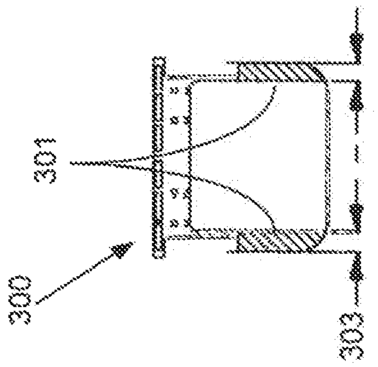
Figure 11C:
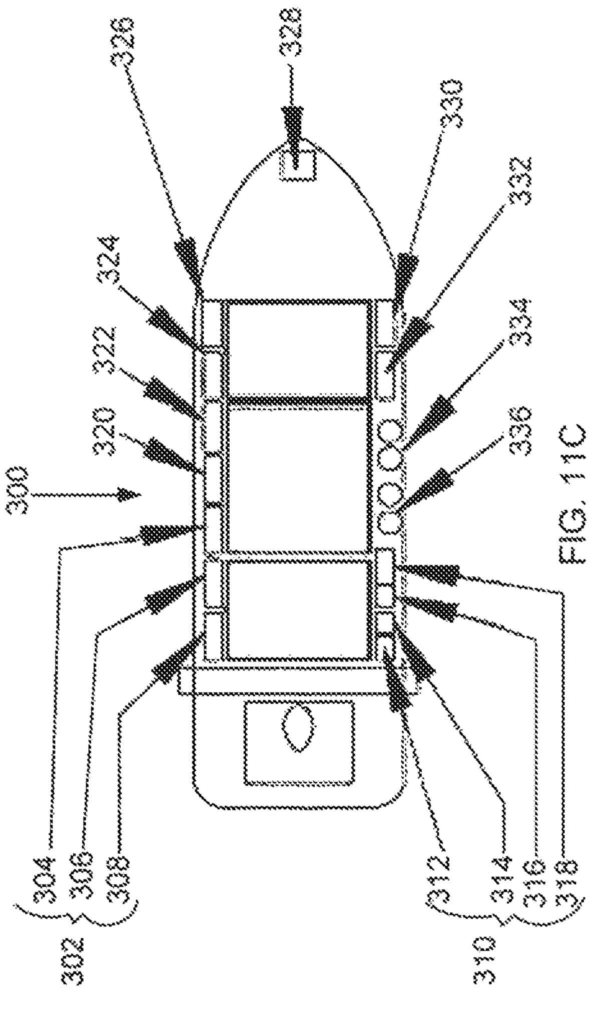

FIG. 11 shows a preferred arrangement of a converted single hull oil tanker 300 with its oil tanks removed and replaced with new hold walls 301, to give essentially triple wall containment of the cargo carried within the pipe bundles 340 now filling the holds. The embodiment shown is an integral carrier 300 having the complete modular process train mounted on board. This enables the vessel to service an offshore loading buoy (see FIG. 1B), prepare the natural gas for storage, produce the CGL cargo and then transport the CGL cargo to market, and during offloading, separate the hydrocarbon solvent from the CGL for reuse on the next voyage, and transfer the natural gas cargo to an offloading buoy/market facility. Depending on field size, natural production rate, vessel capacity, fleet size, quantity and frequency of vessel visits, as well as distance to markets, the system configuration can vary. For example, two loading buoys with overlapping tie up of vessels can reduce the need for between-load field storage required to assure continuous field production.

As noted above, the carrier vessel 300 advantageously includes modularized processing equipment including, for example, a modular gas loading and CGL production system 302 having a refrigeration heat exchanger module 304, a refrigerator compressor module 306, and vent scrubber modules 308, and a modular CGL gasification offloading system 310 having a power generation module 312, a heat medium module 314, a nitrogen generation module 316, and a methanol recovery module 318. Other modules on the vessel include, for example, a metering module 320, a gas compressor module 322, gas scrubber modules 324, a fluid displacement pump module 330, a CGL circulation module 332, natural gas recovery tower modules 334, and solvent recovery tower modules 336. The vessel also preferably includes a special duty module space 326 and gas loading and offloading connections 328.

Figure 12A:
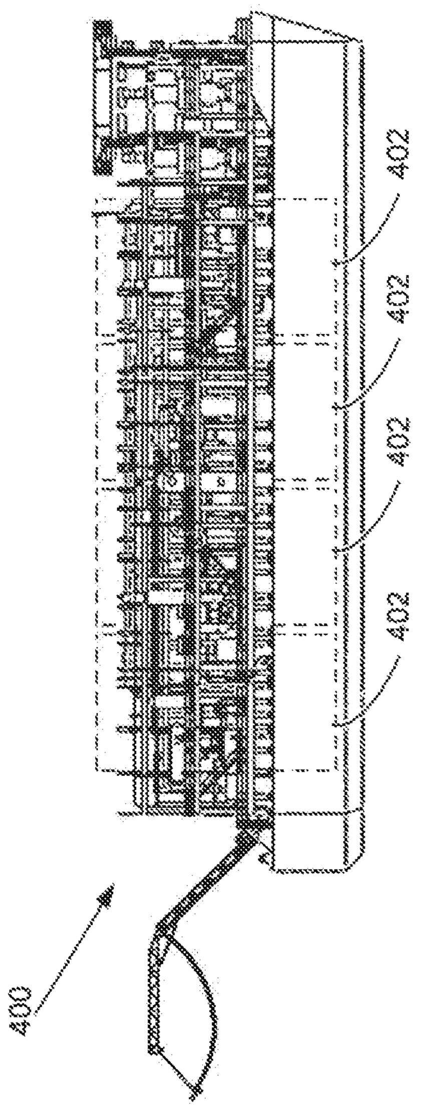
FIGS. 12A-12B are elevation and plan views of a loading barge with production gas processing, conditioning, and CGL production capabilities.
Figure 12B:
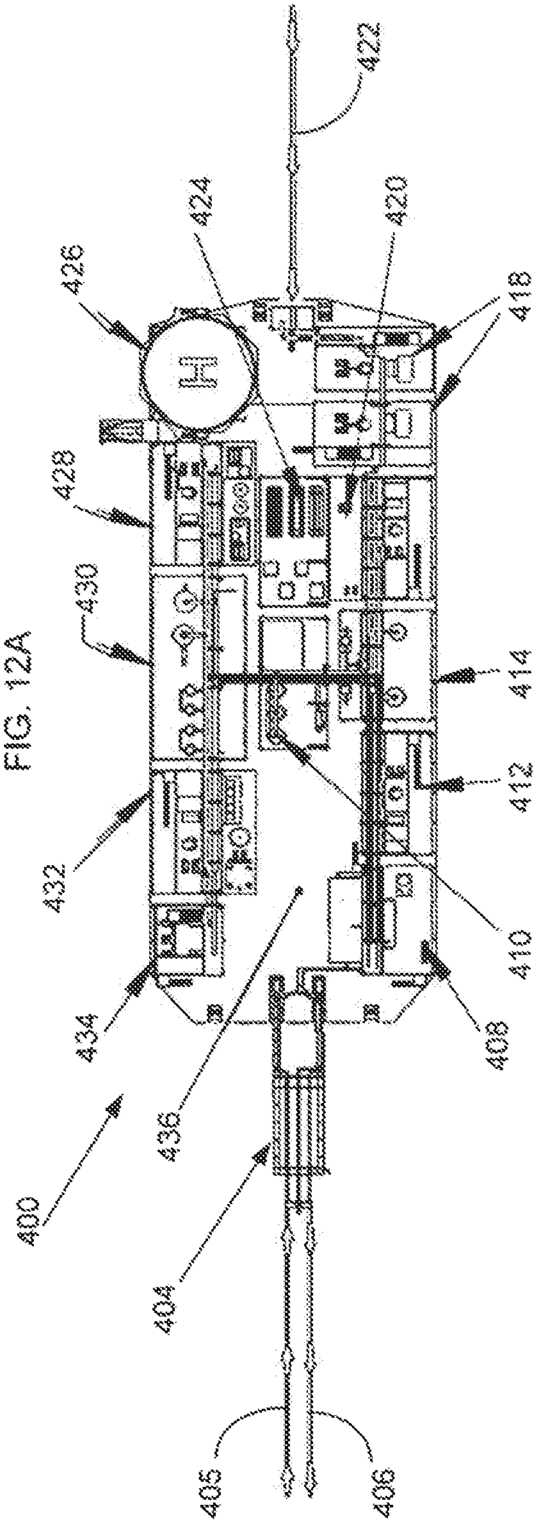

FIG. 12 shows the general arrangement of a loading barge 400 carrying the process train to produce the CGL product. Equations of economics may dictate the need to share process equipment. A single processing barge, tethered in the production field, can serve a succession of vessels configured as "shuttle vessels". Where continuous loading/production is crucial to field operations and the critical point in the delivery cycle involves the timing of transportation vessel arrivals, a gas processing vessel with integral swing or overflow, buffer or production swing storage capacity is utilized in place of a simple loading barge (FPO). Correspondingly the shuttle transport vessels would be serviced at the market end by an offloading barge configured as per FIG. 15. The burden of providing capital for loading and unloading process trains on every vessel in a custom fleet is thereby removed from the overall fleet cost by incorporating these systems on board vessels moored at the loading and unloading points of the voyage.

The loading barge 400 preferably includes CGL product storage modules 402 and modularized processing equipment including, for example, a gas metering module 408, a mol sieve module 410, gas compression modules 412 and 416, a gas scrubber module 414, power generation modules 418, a fuel treatment module 420, a cooling module 424, refrigeration modules 428 and 432, refrigeration heat exchanger modules 430, and vent module 434. In addition, the loading barge preferably includes a special duty module space 436, a loading boom 404 with a line 405 to receive solvent from a carrier and a line 406 to transmit CGL product to a carrier, a gas receiving line 422, and a helipad and control center 426.

The flexibility to deliver to any number of ports according to changes in market demand and the pricing of a spot market for natural gas supplies and NGLs would require that the individual vessel be configured to be self contained for offloading natural gas from its CGL cargo, and recycling the hydrocarbon solvent to onboard storage in preparation for use on the next voyage. Such a vessel now has the flexibility to deliver interchangeable gas mixtures to meet the individual market specifications of the selected ports.

Figure 13B:
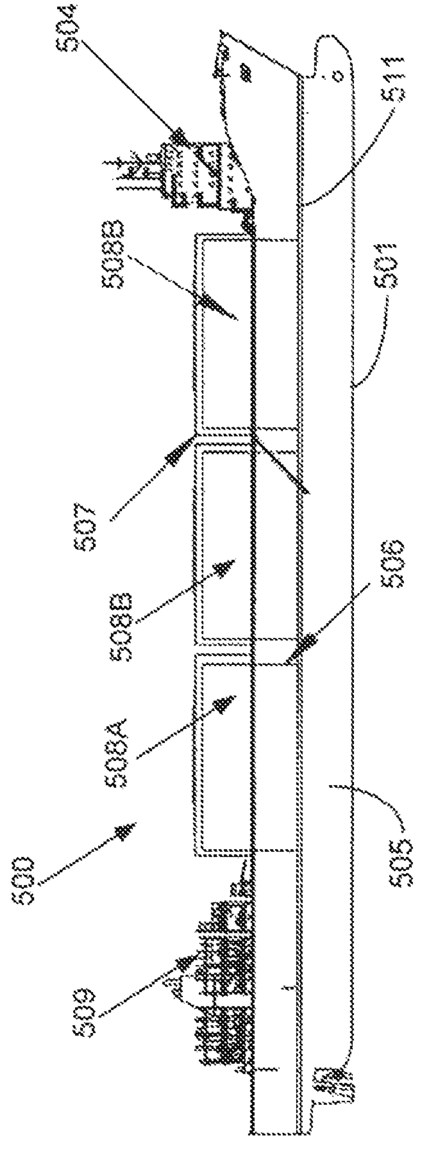
FIGS. 13A-13C are front elevation, elevation and plan views of a new build shuttle vessel with CGL product transfer capabilities.
Figure 13A:
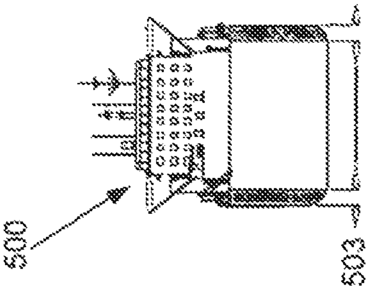
Figure 13C:
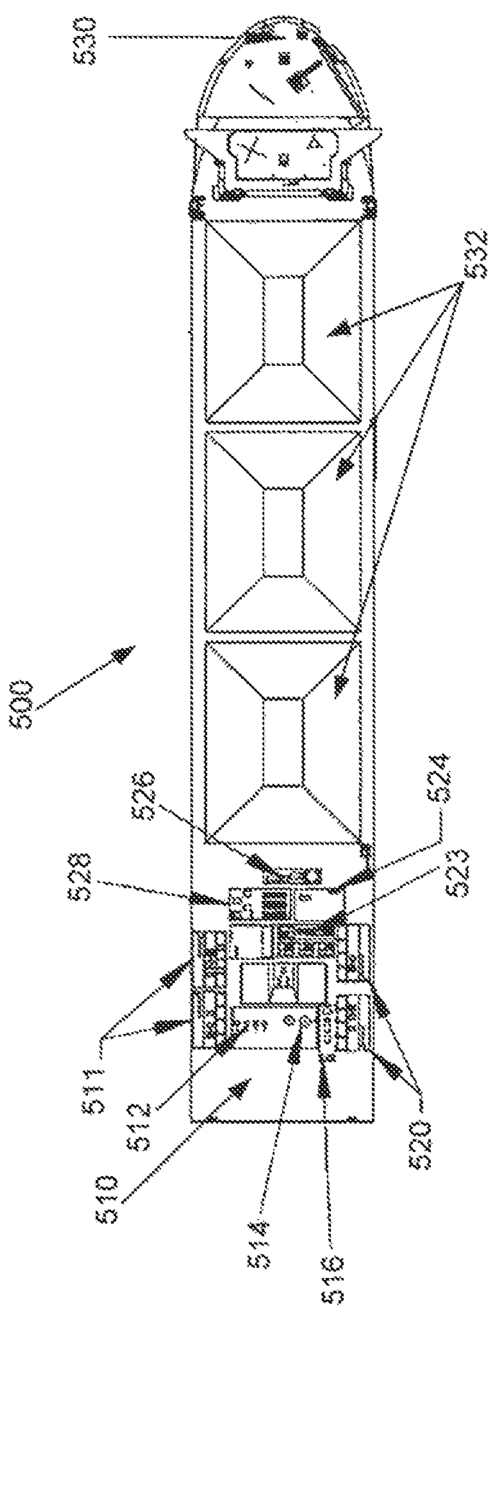

FIGS. 13A-C show a new build vessel 500 configured for CGL product storage and unloading to an offloading barge. The vessel is built around the cargo considerations of the containment system and its contents. Preferably, the vessel 500 includes a forward wheelhouse position 504, a containment location predominantly above the freeboard deck 511, and ballast below 505. The containment system 506 can be split into more than one cargo zone 508A-C, each of which is afforded a reduced crush zone 503 in the sides of the vessel 500. The interlocking bundle framing and boxed in design tied into the vessel structure permits this interpretation of construction codes and enables the maximum use of the hulls volume to be dedicated to cargo space.

At the rear of the vessel 500, deck space is provided for the modular placement of necessary process equipment in a more compact area than would be available on board a converted vessel. The modularized processing equipment includes, for example, displacement fluid pump modules 510, refrigeration condenser modules 512, a refrigeration scrubber and economizer module 514, a fuel process module 516, refrigeration compressor modules 520, nitrogen generator modules 522, a CGL product circulation module 524, a water treatment module 526, and a reverse osmosis water module 528. As shown, the containment fittings for the CGL product containment system 506 are preferably above the water line. The containment modules 508A, 508B and 508C of the containment system 506, which could include one or more modules, are positioned in the one or more containment holds 532 and enclosed in a nitrogen hood or cover 507.

Figure 14:
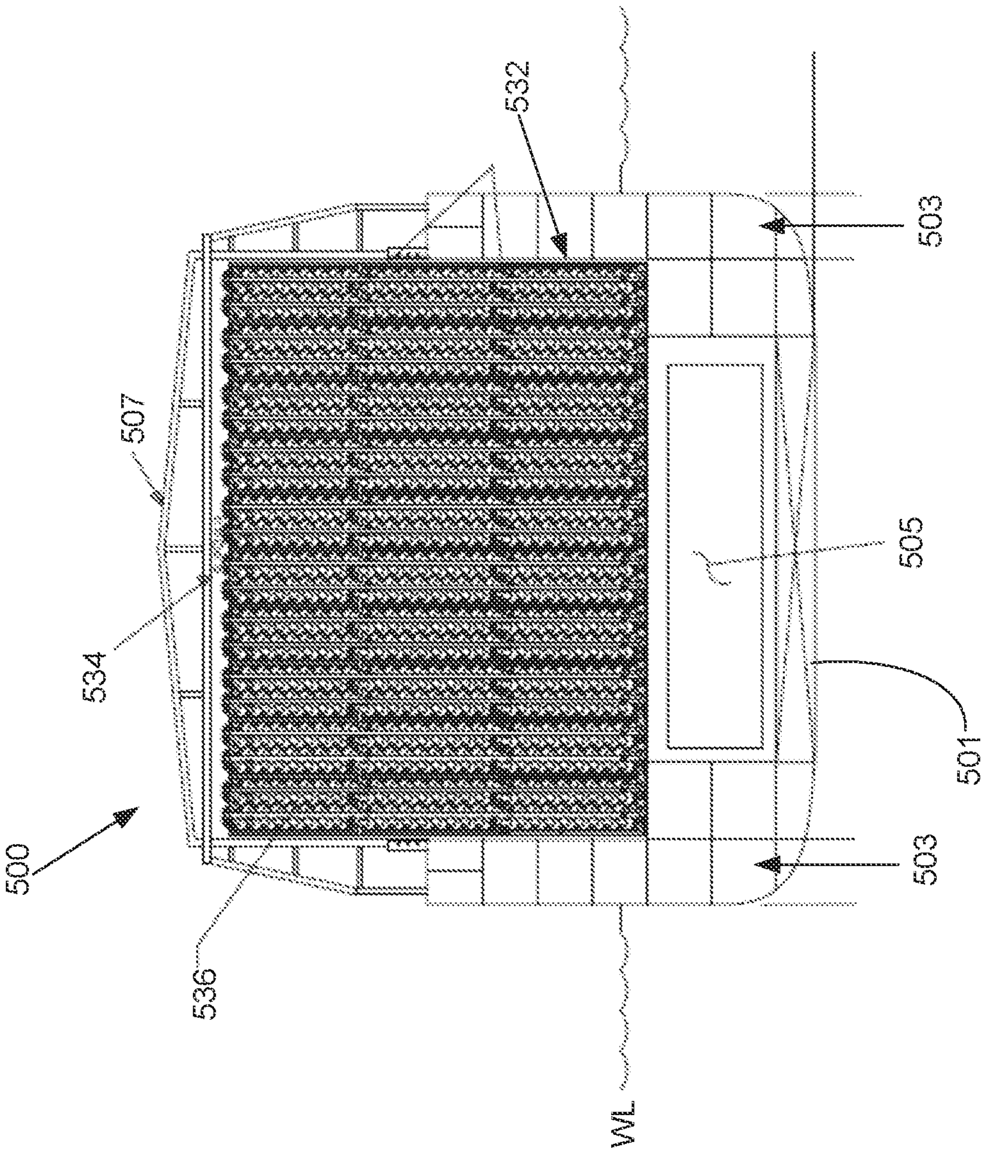
FIG. 14 is a cross section view of the storage area of a new build vessel (taken along line 14-14 in FIG. 13A) with relative position of freeboard deck and reduced crush zone.

Turning to FIG. 14, a cross-section of the vessel 500 through a containment hold 532 shows crumple zones 503, which preferably are reduced to about 18% of overall width of the vessel 500, a ballast and displacement fluid storage area 505, stacked containment pipeline bundles 536 positioned within the hold 532, and the nitrogen hood 507 enclosing the pipeline bundles 536. As depicted, all manifolds 534 are above the pipeline bundles 534 ensuring that all connections are above the water line WL.

Figure 15A:
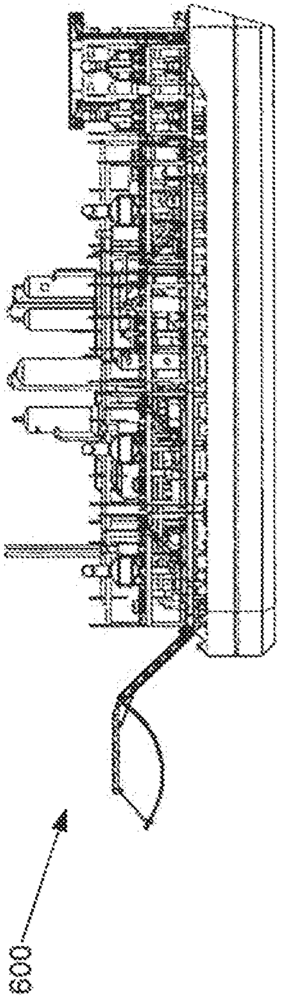
FIGS. 15A-15B are elevation and plan view s of an offloading barge with fractionation and solvent recovery capabilities.
Figure 15B:
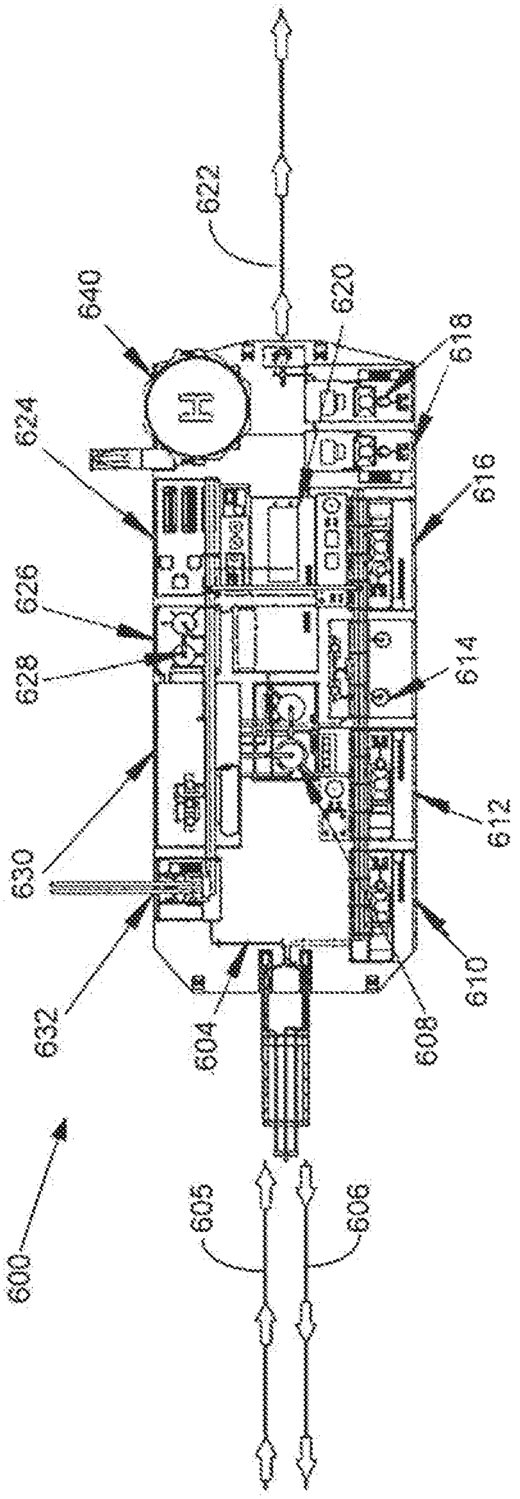
Figure 16A:
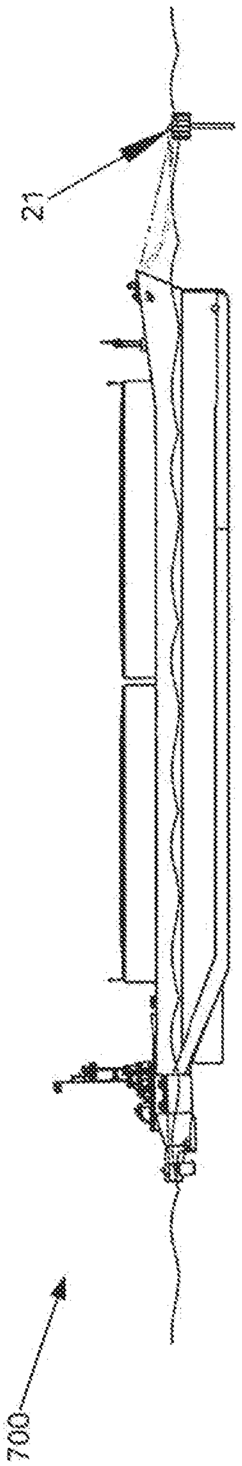
FIGS. 16A-D are elevation, plan and detail views of an articulated tug and barge with CGL shuttle and product transfer capabilities.
Figure 16B:
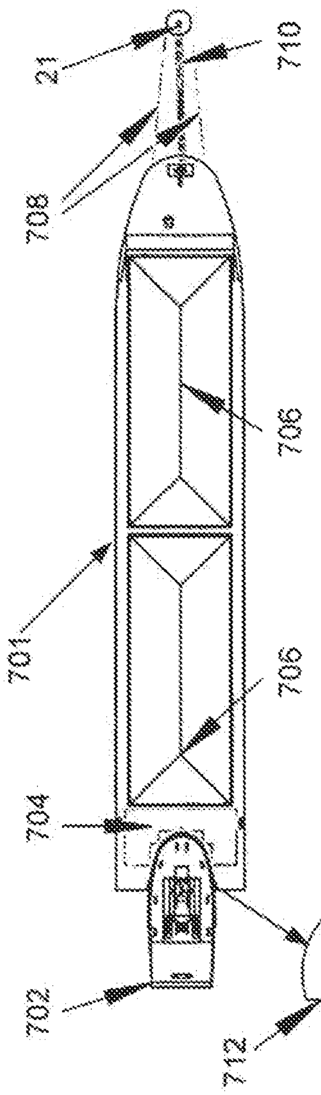
Figure 16C:
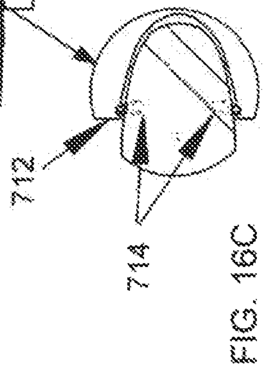
Figure 16D:
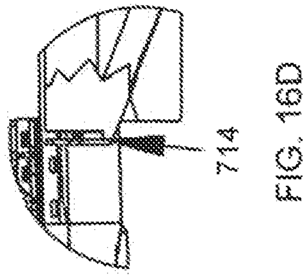

FIG. 15 shows the general arrangement of an offloading barge 600 carrying the process train to separate the CGL product. The offloading barge 600 preferably includes modularized processing equipment including, for example, natural gas recovery column modules 608, gas compression modules 610, 612 and 614, a gas scrubber module 614, power generation modules 618, gas metering modules 620, a nitrogen generation module 624, a distillation support module 626, solvent recovery column modules 628, and a cooling module 630, a vent module 632. In addition, the offloading barge 600, as depicted, includes a helipad and control center 640, a line 622 for transmitting natural gas to market transmission pipelines, an offloading boom 604 including a line 605 for receiving CGL product from a carrier vessel and a line 606 for returning solvent return to a carrier vessel.

FIG. 16 shows the general arrangement of an articulated tug-barge shuttle 700 with an offloading configurations. The barge 700 is built around the cargo considerations of the containment system and its contents. Preferably, the barge 700 includes a tug 702 couplable to the barge 701 through a pin 714 and ladder 712 configuration. One or more containment holds 706 are provided predominantly above the freeboard deck. At the rear of the barge 701, deck space 704 is provided for the modular placement of necessary process equipment in a more compact area than would be available on board a converted vessel. The barge 700 further comprises an offloading boom including and offloading line 710 couplable to an offloading buoy 21 and houser lines 708.

The disclosed embodiments advantageously make a larger portion of the gas produced in the field available to the market place, due to low process energy demand associated with the embodiments. Assuming all the process energy can be measured against a unit BTU content of the natural gas produced in the field, a measure to depict percentage breakout of the requirements of each of the LNG, CNG and CGL process systems can be tabulated as shown below in Table 3.

Each system starts with a High Heat Value (HHV) of 1085 BTU/ft3. The LNG process reduces HHV to 1015 BTU/ft3 for transportation through extraction of NGLs. Make-up BTU spiking and crediting the energy content of NGLs is included for LNG case to level the playing field. A heat rate of 9750 BTU per kWhr is used in all cases.

TABLE 3

Energy Balance Summary for Typical LNG, CNG and CGL Systems

| | LNG System | CNG System (SG = 0.6) | CGL System (SG 0.6) |
|---|---|---|---|
| Field gas | 100% | 100% | 100% |
| Process/Loading | 9.34% | 4% | 2.20% |
| NGL Byproduct | 7% | Not Applicable | Not Applicable |
| Unloading/Process | 1.65% | 5% | 1.12% |
| BTU Equivilance Spike | 4% | Not Applicable | Not Applicable |
| Available for Market | 76% | 91% | 97% |

(85% with NGL Credit)

With credit for NGL's, the LNG process will sum up to 85% total value for Market delivery of BTUs—a quantity still less than the deliverable of this invention. Results are typical for individual technologies. The data provided in Table 3 was sourced as follows: LNG—third party report by Zeus Energy Consulting Group 2007; CNG—reverse engineering Bishop Patent #6655155; and CGL—internal study by SeaOne Corp.

Overall the disclosed embodiments provide a more practical and rapid deployment of equipment for access to remote, as well as developed natural gas reserves, than has hitherto been provided by either LNG or CNG systems in all of their various configurations. Materials required are of a non-exotic nature, and are able to be readily supplied from standard oilfield sources and fabricated in a large number of industry yards worldwide.

Figure 17:
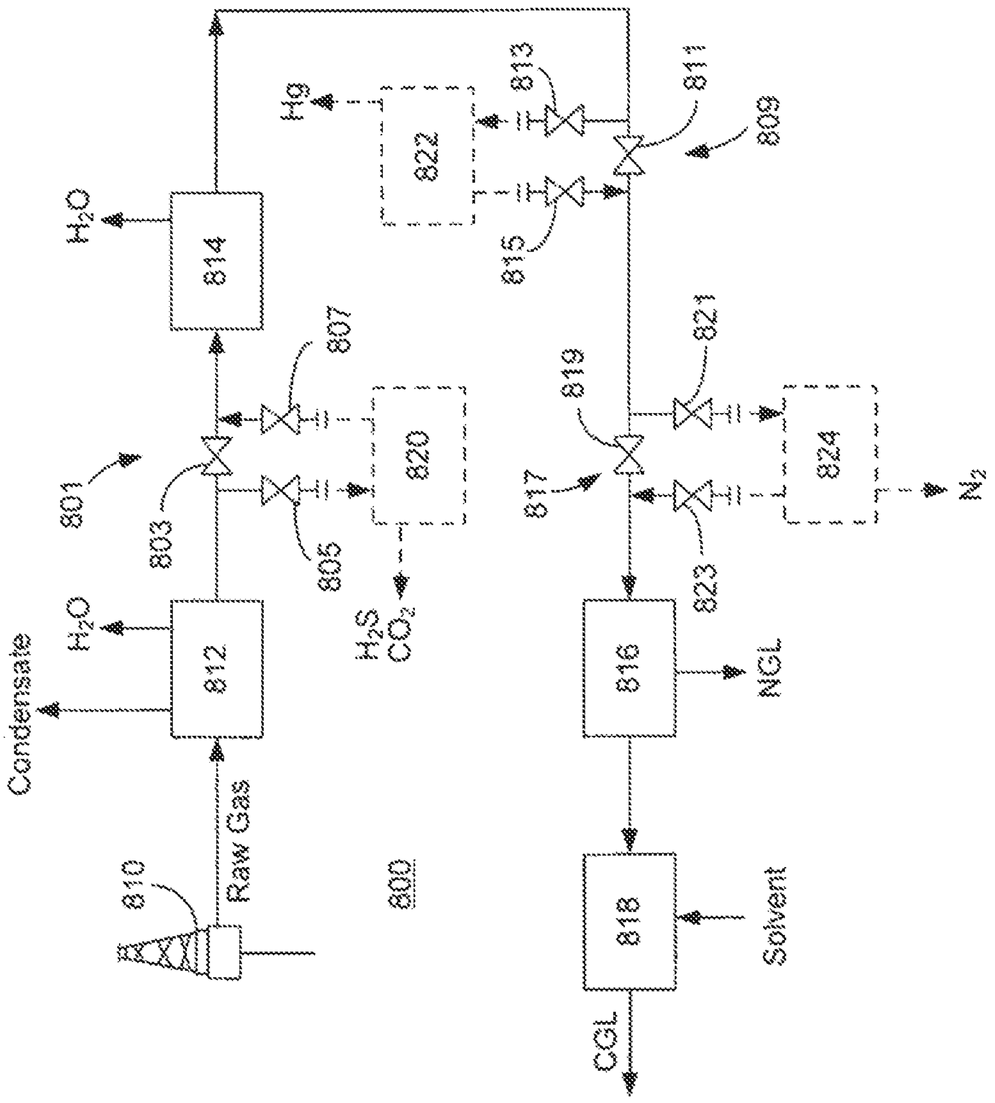
FIG. 17 is a schematic flow diagram illustrating raw gas being processed through a modular loading process train.

Turning to FIG. 17, the typical equipment used on a loading process train 800 taking raw gas from a gas source 810 to become the liquid storage solution CGL is shown. As depicted, modular connection points 801, 809 and 817 allow for the loading process train on the loading barge 400 depicted in FIGS. 12A and 12B and the integral carrier 300 depicted in FIGS. 11A-11C to cater to a wide variety worldwide gas sources, many of which are deemed "non typical". As depicted, for "typical" raw gas received from a source 810 is fed to separator vessel(s) 812 where settlement, choke or centrifugal action separates the heavier condensates, solid particulates and formation water from the gas stream. The stream itself passes through an open bypass valve 803 at modular connection point 801 to a dehydration vessel 814 where by absorption in glycol fluid or by adsorption in packed desiccant the remaining water vapor is removed. The gas stream then flows through open bypass valves 811 and 819 at modular connection points 809 and 817 to a module 816 for the extraction of NGL. This typically is a turbo expander where the drop in pressure causes cooling resulting in a fall out of NGLs from the gas stream. Older technology using oil absorption system could alternatively be used here. The natural gas is then conditioned to prepare the CGL liquid storage solution. The CGL solution is produced in a mixing train 818 by chilling the gas stream and introducing it to the hydrocarbon solvent in a static mixer as discussed with regard to FIG. 4A above. Further cooling and compression of the resulting CGL prepares the product for storage.

However, gas with high content condensates from fields such as the South Pars fields could be handled by providing additional separator capacity to the separator equipment 812. For natural gas mixes with undesirable levels of acid gasses such $CO_2$ and $H_2S$, Chlorides, Mercury and Nitrogen the bypass valves 803, 811 and 819 at modular connection points 801, 809 and 817 can be closed as needed and the gas stream routed through process modules 820, 822 and 824 attached to the associated branch piping and isolation valves 805, 807, 813, 815, 821 and 823 shown at each by pass station 801, 809 and 817. For example, raw gas from the Malaysian deepwater fields of Sabah and Sarawak containing unacceptable levels of acid gas could be routed around a closed by-pass valve 803 and through open isolation valves 805 and 807 and an attached module 820 where amine absorption and iron sponge systems extract the $CO_2$, $H_2S$, and sulfur compounds. A process systems module for the removal of mercury and chlorides is best positioned downstream of dehydration unit 814. This module 822 takes the gas stream routed around a closed by pass valve 811 through open isolation valves 813 and 815, and comprises a vitrification process, molecular sieves or activated carbon filters. For raw gas with high levels of nitrogen as found in the raw gas from some areas of the Gulf of Mexico, the a gas stream is routed around a closed by-pass valve 819 and through open isolation valves 821 and 823, passing the natural gas stream through a scale selected process module 824 to remove nitrogen from the gas stream. Available process types include membrane separation technology, absorptive/adsorptive tower and a cryogenic process attached to the vessels nitrogen purge system and storage pre chilling units.

The extraction process describes above can also provide a first stage to the NGL module 816, assisting the additional capacity required to deal with high liquids mixes such as those found in the East Qatar field.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, unless otherwise stated, and the invention can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

The invention claimed is:

1. A method for processing, storing and transporting natural gas from supply source to market, comprising receiving natural gas on a production barge comprising processing equipment modules configured to produce a compressed gas liquid (CGL) product comprising a liquid phase mixture of natural gas and a hydrocarbon liquid solvent in a liquid medium form, wherein the hydrocarbon liquid solvent includes one or more of ethane, propane and butane, wherein the production barge is moveable between gas supply locations, producing on the production barge a supply of CGL product for storage and transport, loading the CGL product from the production barge onto a marine transport vessel comprising a containment system configured to store the CGL product at storage pressures and temperatures at selected points in the ranges of −40F to −80F, and 900 psig to 2150 psig and associated with storage densities for the natural gas that exceeds the storage densities of compressed natural gas (CNG) for the same storage pressures and temperatures, and recirculating the stored CGL product on the marine transport vessel to maintain temperatures and pressures of the stored CGL product at selected points in the ranges −40F to −80F, and 900 psig to 2150 psig.

2. The method of claim 1 wherein the containment system comprises tubular containment piping configured in a looped pipeline system with horizontally nested interconnected pipe bundles.

3. The method of claim 2 wherein the horizontally nested pipe system is configured for serpentine fluid flow pattern between adjacent pipes.

4. The method of claim 2 wherein the pipe bundles are vertically stackable in first and second pipe stack configurations, wherein the first and second pipe stack configurations are horizontally interlockable to one another.

5. The method of claim 1 further comprising the step of adjusting the composition of the natural gas delivered to market by adding or removing one or more process equipment modules on the production barge.

6. The method of claim 4 further comprising the step of isolating at least one pipe stack from at least one other pipe stack for mixed or partial load containment.

7. The method of claim 1 further comprising the step of loading the CGL product into the containment system against a back pressure of a displacement fluid sufficient to maintain the CGL product in it liquid state.

8. The method of claim 1 wherein the step of storing the CGL product in the containment system includes storing CGL product in a range of stored gas mass-to-containment structure mass ratio of about 0.73 to about 0.75 lb/lb for the natural gas in the CGL product.

9. A method for processing natural gas from supply source and producing, storing and transporting a compressed gas liquid (CGL) product comprising a liquid phase mixture of natural gas and a hydrocarbon liquid solvent in a liquid medium form, wherein the hydrocarbon liquid solvent includes one or more of ethane, propane and butane, to deliver natural gas to market, comprising storing a CGL product on a marine transport vessel comprising a containment system configured to store the CGL product at storage pressures and temperatures at selected points in the ranges of −40F to −80F, and 900 psig to 2150 psig and associated with storage densities for the natural gas that exceeds the storage densities of compressed natural gas (CNG) for the same storage pressures and temperatures, and unloading the CGL product from the containment system on the marine transport vessel to an offloading barge comprising separation, fractionation and offloading equipment modules for separating the CGL product into its natural gas and solvent constituents and offloading natural gas to storage or pipeline facilities, wherein the offloading barge is moveable between gas market offloading locations.

10. The method of claim 9 further comprising the step of adjusting the composition of the natural gas delivered to market by adding or removing one or more fractionation equipment modules on the offloading barge.

11. The method of claim 9 further comprising the step of flowing a displacement fluid into the containment system on the marine transport vessel and fully displacing the CGL product from the containment system on the marine transport vessel.

12. The method of claim 9 further comprising the step of adjusting a gross heat content of an offloaded gas.

13. The method of claim 9 further comprising the step of separating the CGL product on the offloading barge into its natural gas and solvent constituents.

14. The method of claim 9 further comprising the step of offloading the natural gas from the offloading barge to storage or pipeline facilities.

15. The method of claim 9 further comprising the step of recirculating the stored CGL product on the marine transport vessel to maintain temperatures and pressures of the stored CGL product at selected points in the ranges of −40 F to −80 F, and 900 psig to 2150 psig.

16. The method of claim 9 wherein the containment system is configured to separately store the CGL product and natural gas liquids (NGLs).

17. The method of claim 1 wherein the containment system is configured to separately store the CGL product and natural gas liquids (NGLs).

* * * * *